(12) United States Patent
Isomura et al.

(10) Patent No.: US 8,232,325 B2
(45) Date of Patent: Jul. 31, 2012

(54) SEPARATION MEMBRANE FOR DIRECT LIQUID FUEL CELL AND METHOD FOR PRODUCING SAME

(75) Inventors: Takenori Isomura, Shunan (JP); Masayuki Kishino, Shunan (JP); Kenji Fukuta, Shunan (JP)

(73) Assignee: Tokuyama Corporation, Yamaguchi (JP)

( * ) Notice: Subject to any disclaimer, the term of this patent is extended or adjusted under 35 U.S.C. 154(b) by 1008 days.

(21) Appl. No.: 12/224,427

(22) PCT Filed: Feb. 27, 2007

(86) PCT No.: PCT/JP2007/053639
§ 371 (c)(1),
(2), (4) Date: Aug. 27, 2008

(87) PCT Pub. No.: WO2007/099954
PCT Pub. Date: Sep. 7, 2007

(65) Prior Publication Data
US 2010/0003574 A1    Jan. 7, 2010

(30) Foreign Application Priority Data

Feb. 28, 2006  (JP) .................................. 2006-052227
Jun. 15, 2006  (JP) .................................. 2006-165503
Dec. 28, 2006  (JP) .................................. 2006-354062
Feb. 2, 2007   (JP) .................................. 2007-024660

(51) Int. Cl.
C08J 5/22      (2006.01)
H01M 8/10      (2006.01)
C08F 8/12      (2006.01)

(52) U.S. Cl. ............. 521/27; 521/25; 429/492; 429/493

(58) Field of Classification Search ................... 521/27, 521/25; 429/492, 493
See application file for complete search history.

(56) References Cited

U.S. PATENT DOCUMENTS

| | | | |
|---|---|---|---|
| 6,689,501 B2 * | 2/2004 | Stone et al. ............... | 429/483 |
| 7,892,694 B2 * | 2/2011 | Nakano et al. ............. | 429/491 |
| 2002/0019448 A1 | 2/2002 | Sugaya et al. | |
| 2002/0042451 A1 | 4/2002 | Sugaya | |

FOREIGN PATENT DOCUMENTS

| | | |
|---|---|---|
| EP | 1 179 550 A1 | 2/2002 |
| JP | 5-262993 A | 10/1993 |
| JP | 9-216964 A | 8/1997 |
| JP | 11-310649 A | 11/1999 |
| JP | 2000-90945 A | 3/2000 |
| JP | 2000-119420 A | 4/2000 |
| JP | 2001-135328 A | 5/2001 |
| JP | 2002-102717 A | 4/2002 |
| JP | 2002-114854 A | 4/2002 |
| JP | 2002-175838 A | 6/2002 |
| JP | 2002-338721 A | 11/2002 |

OTHER PUBLICATIONS

Machine translation of JP 2001-135328 A; pub. date: May 2001.*
Database WPI Week 200154: 2001-491684; XP002585120 & JP 2001-135328 A; May 18, 2001.
Supplementary European Search Report dated Jun. 16, 2010 issued in corresponding European Patent Application No. 07737441.1-2119.

* cited by examiner

Primary Examiner — Fred M Teskin
(74) Attorney, Agent, or Firm — Birch, Stewart, Kolasch & Birch, LLP

(57) ABSTRACT

In the present invention is disclosed a method for producing a membrane for direct liquid fuel cell, which comprises polymerizing and curing a polymerizable composition containing at least a) an aromatic polymerizable monomer wherein one polymerizable group, at least one hydrogen atom, and at least one substituent selected from the group consisting of methyl group bonded at the para-position relative to the polymerizable group, alkyl group having two or more carbon atoms, halogen atom, acyloxy group and alkoxy group are bonded to the aromatic ring, b) a crosslinkable polymerizable monomer, and c) a polymerization initiator, or impregnating the polymerizable composition into a porous membrane and polymerizing and curing the polymerizable composition, and then introducing a cation exchange group into the aromatic ring derived from the aromatic polymerizable monomer.

9 Claims, 1 Drawing Sheet

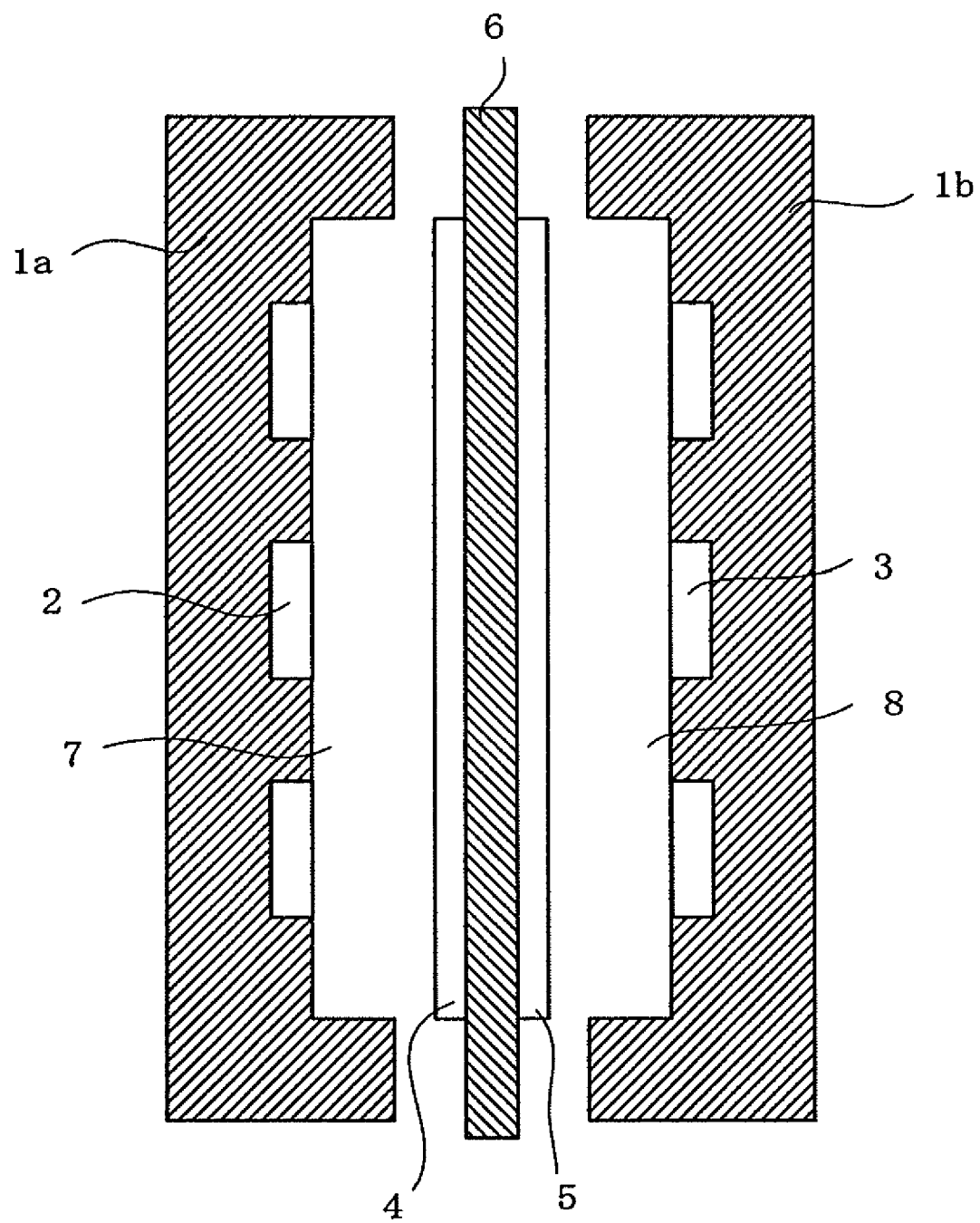

SEPARATION MEMBRANE FOR DIRECT LIQUID FUEL CELL AND METHOD FOR PRODUCING SAME

TECHNICAL FIELD

The present invention relates to a membrane for direct liquid fuel cell and a method for producing the same. The membrane has particular functional groups at particular positions of the aromatic ring and shows low permeability to liquid fuels such as methanol and the like.

BACKGROUND ART

Ion exchange membrane is in wide use as a membrane for solid polymer fuel cell, redox flow cell or zinc-bromine cell or the like, a membrane for dialysis, etc. Solid polymer fuel cell uses an ion exchange membrane as the electrolyte membrane. This fuel cell is an electricity generation system in which a fuel and an oxidizing agent are fed continuously, they are reacted, and the resulting chemical energy is taken out as an electric power; and it is an electricity generation system which is clean and highly efficient. In recent years, the solid polymer fuel cell has increased its importance for uses in automobile, household and portable device because it can be operated at low temperatures and can be produced in a small size.

The solid polymer fuel cell has, in general, a structure in which a gas diffusion electrode having a catalyst loaded thereon is bonded to each side of a membrane composed of a solid polymer functioning as an electrolyte. When electricity is generated using such a solid polymer fuel cell, hydrogen gas or a liquid fuel (e.g. methanol) is fed into a chamber (fuel chamber) in which one of the gas diffusion electrodes is present, and an oxygen-containing gas as an oxidizing agent (e.g. oxygen or air) is fed into a chamber in which the other gas diffusion electrode is present. When, in this state, an external circuit is connected to the two gas diffusion electrodes, the fuel cell works as such and an electric power is supplied to the external circuit.

Of solid polymer fuel cells, direct liquid fuel cell using methanol or the like per se as the fuel, is evaluated highly because it uses a liquid fuel easy to handle and the fuel is inexpensive. Therefore, solid polymer fuel cells are expected as a electric source of relatively small output used especially for portable device.

The fundamental structure of direct liquid fuel cell is shown in the drawing. In the drawing, 1a and 1b are each a partition wall of cell. The cell partition walls 1a and 1b are formed at the both sides of a solid polymer electrolyte membrane 6 used as a membrane so as to sandwich the solid polymer electrolyte membrane 6. 2 is a fuel passage formed in the inner wall of one cell partition wall 1a. 3 is an oxidizer gas passage formed in the inner wall of other cell partition wall 1b. 4 is a diffusion electrode of fuel chamber side. 5 is a gas diffusion electrode of oxidizer chamber side.

In this direct liquid fuel cell, when a liquid fuel such as alcohol or the like is fed into a fuel chamber 7, proton (hydrogen ion) and electron are generated at the fuel chamber side diffusion electrode 4. The proton passes through the inside of solid polymer electrolyte membrane 6 and reaches an oxidizer chamber 8, where the proton reacts with oxygen gas or with the oxygen in air, generating water. The electron generated at the fuel chamber side diffusion electrode 4 passes through an external circuit (not shown) and is sent to the oxidizer chamber side gas diffusion electrode 5. At this time, the external circuit is provided with an electric energy.

In the direct liquid fuel cell having the above-mentioned structure, there is ordinarily used a cation exchange membrane as the solid polymer electrolyte membrane 6. The cation exchange membrane is required to have properties of small electric resistance, high physical strength and low permeability to liquid fuel used. When the cation exchange membrane has a high permeability to liquid fuel, the liquid fuel fed into the fuel chamber migrates to an oxidizer chamber side, resulting in a reduced cell output.

As the cation exchange membrane used as a membrane for fuel cell, there has been known, for example, a membrane in which a cation exchange resin is filled in the pores of a porous membrane made of a polyolefin resin or a fluoroplastic. This cation exchange membrane is produced by a method which comprises filling, in the pores of a porous membrane, a polymerizable composition composed of a polymerizable monomer having a functional group into which a cation exchange group can be introduced and a crosslinkable polymerizable monomer, polymerizing the polymerizable composition to form a resin, and introducing a cation exchange group into the functional group into which a cation exchange group can be introduced (for example, Patent Literatures 1 and 2). The method can produce a membrane for fuel cell at a relatively low cost and the membrane produced is small in electric resistance, low in permeability to hydrogen gas, and low in swelling and deformation caused by solvent.

Patent Literature 1: JP2001-135328 A
Patent Literature 2: JP1999-310649 A

DISCLOSURE OF THE INVENTION

Task To Be Achieved by the Invention

However, when these cation exchange membranes are used as a membrane for direct liquid fuel cell, it is impossible to completely block the permeation of liquid fuel (e.g. alcohol) through cation exchange membrane. Consequently, there arises the migration of liquid fuel from fuel chamber side to oxidizer chamber side, resulting in a reduced cell performance.

To reduce this problem, the present inventors made a study on a method for increasing the content of crosslinkable polymerizable monomer in the polymerizable composition filled in the pores of porous membrane and thereby decreasing the relative amount of hydrophilic cation exchange group introduced. By this method, the hydrophobicity of cation exchange membrane obtained is enhanced and the crosslinking degree of the membrane is also enhanced. As a result, there was obtained an ion exchange membrane which was dense and which was effective to some extent with respect to the blockage of permeation of liquid fuel. On the other hand, however, there arose a problem of increased electric resistance of cation exchange membrane and reduced cell output. No membrane for fuel cell which is satisfactory in this respect in practical use, is not developed yet.

Incidentally, in the method for producing a cation exchange membrane for fuel cell, cited above as conventional techniques, it is also disclosed to use, as a monomer component of the polymerizable composition filled in the pores of a porous membrane, a polymerizable monomer (a third copolymerization component) having no functional group into which a cation exchange group can be introduced, such as acrylonitrile, acrolein, methyl vinyl ketone or the like, besides the previously-mentioned polymerizable monomer having a functional group into which a cation exchange group can be introduced and the previously-mentioned crosslinkable polymerizable monomer. Any of these polymerizable monomers described as a third copolymerization component, however, has high hydrophilicity. Therefore, a cation exchange membrane obtained by copolymerizing such a third copolymerization component has high hydrophilicity. As a result, the cation exchange membrane showed no enhanced blockage for permeation of liquid fuel such as highly hydrophilic alcohol or the like. Thus, a cation exchange membrane obtained using the above-mentioned-third copolymerization component, when used as a membrane for fuel cell, is insufficient in the blockage of permeation of liquid fuel such as alcohol or the like.

Under the above-mentioned background, the present invention aims at providing a membrane for fuel cell, made of a cation exchange membrane, which is low in permeation of liquid fuel such as alcohol or the like, particularly in methanol permeation, is low in electric resistance, shows a stable and high cell output and is unlikely to cause deformation (e.g. swelling); and a method for producing the membrane.

Means for Achieving the Task

The present inventors made a study in order to achieve the above task. As a result, it was found that, when there is used, as the main component of a polymerizable composition filled in the pores of a porous membrane, an aromatic polymerizable monomer having methyl group at the para-position relative to the polymerizable group, as compared with when there is used an aromatic polymerizable monomer having methyl group at the ortho- or meta-position, the permeability of obtained membrane to liquid fuel can be reduced singularly with no increase in membrane resistance.

The present inventors further found that, when there is used, as the main component of a polymerizable composition filled in the pores of a porous membrane, an aromatic polymerizable monomer wherein at least one alkyl group having two or more carbon atoms and at least one hydrogen atom are bonded to the aromatic ring, as compared with when there is used an aromatic polymerizable monomer having methyl group at the ortho- or meta-position, the permeability of obtained membrane to liquid fuel, particularly to methanol can be reduced singularly.

The present inventors furthermore found that, when there is used, as a membrane for fuel cell, a cation exchange resin wherein alkoxy group is bonded to the cation exchange group-bonded aromatic ring, as compared with when there is used a cation exchange membrane having no bonded alkoxy group, the permeability of cation exchange membrane to liquid fuel can be reduced singularly with no increase in electric resistance of the membrane.

The present inventors furthermore found that, when there is used, as a membrane for fuel cell, a cation exchange resin wherein hydroxyl group is bonded to the cation exchange group-bonded aromatic ring, as compared with when there is used a cation exchange membrane having no bonded hydroxyl group, the electric resistance of cation exchange membrane can be reduced significantly and the permeability of the membrane to liquid fuel is the same to those of conventional membranes.

The present inventors furthermore found that, when there is used, as a membrane for fuel cell, a cation exchange resin wherein halogen element is bonded to the cation exchange group-bonded aromatic ring, as compared with when there is used a cation exchange membrane having no bonded halogen element, the permeability of cation exchange membrane to liquid fuel can be reduced singularly with no increase in electric resistance of the membrane.

The above findings have led to the completion of the present invention.

Therefore, the present invention is as described below.

[1]
A method for producing a membrane for direct liquid fuel cell, which comprises polymerizing and curing a polymerizable composition containing at least a) an aromatic polymerizable monomer wherein one polymerizable group, at least one hydrogen atom, and at least one substituent selected from the group consisting of methyl group, alkyl group having two or more carbon atoms, halogen atom and alkoxy group are bonded to the aromatic ring and, when the number of methyl groups bonded to the aromatic ring is one or more, at least one of the methyl groups is bonded to the aromatic ring at the para-position relative to the polymerizable group, b) a crosslinkable polymerizable monomer, and c) a polymerization initiator, and then introducing a cation exchange group into the aromatic ring derived from the aromatic polymerizable monomer.

[2]
A method for producing a membrane for direct liquid fuel cell, which comprises contacting a polymerizable composition containing at least a) a monocyclic aromatic polymerizable monomer wherein one polymerizable group, at least one hydrogen atom, and at least one substituent selected from the group consisting of methyl group, alkyl group having two or more carbon atoms, halogen atom and alkoxy group are bonded to the aromatic ring and, when the number of methyl groups bonded to the aromatic ring is one or more, at least one of the methyl groups is bonded to the aromatic ring at the para-position relative to the polymerizable group, b) a crosslinkable polymerizable monomer, and c) a polymerization initiator, with a porous membrane to fill the polymerizable composition in the pores of the porous membrane, then polymerizing and curing the polymerizable composition, thereafter introducing a cation exchange group into the aromatic ring derived from the aromatic polymerizable monomer.

[3]
A method for producing a membrane for direct liquid fuel cell, which comprises polymerizing and curing a polymerizable composition containing at least a) an aromatic polymerizable monomer wherein one polymerizable group, at least one alkoxy group or acyloxy group, and at least one hydrogen atom are bonded to the aromatic ring, b) a crosslinkable polymerizable monomer, and c) a polymerization initiator, to obtain a resin membrane, then hydrolyzing the alkoxy group or acyloxy group in the resin membrane to convert the alkoxy group or acyloxy group to hydroxyl group, thereafter introducing a cation exchange group into the aromatic ring in the resin membrane, derived from the aromatic polymerizable monomer.

[4]
A method for producing a membrane for direct liquid fuel cell, which comprises contacting a polymerizable composition containing at least a) an aromatic polymerizable monomer wherein one polymerizable group, at least one alkoxy group or acyloxy group, and at least one hydrogen atom are bonded to the aromatic ring, b) a crosslinkable polymerizable monomer, and c) a polymerization initiator, with a porous membrane to fill the polymerizable composition in the pores of the porous membrane, then polymerizing and curing the polymerizable composition to form a cured resin material, then hydrolyzing the alkoxy group or acyloxy group in the cured resin material to convert the alkoxy group or acyloxy group to hydroxyl group, thereafter introducing a cation exchange group into the aromatic ring in the cured resin material, derived from the aromatic polymerizable monomer.

[5]

The method for producing a membrane for direct liquid fuel cell, according to any of [1] to [4], wherein the aromatic polymerizable monomer is a monocyclic aromatic polymerizable monomer.

[6]

The method for producing a membrane for direct liquid fuel cell, according to [5], wherein the monocyclic aromatic polymerizable monomer has a styrene structure.

[7]

A membrane for direct liquid fuel cell, which comprises an ion exchange resin wherein an aromatic ring having cation exchange group and alkoxy group is bonded to each methylene main chain having a crosslinked structure.

[8]

A membrane for direct liquid fuel cell, which comprises of a porous membrane and an ion exchange resin filled in the pores of the porous membrane, the ion exchange resin being an ion exchange resin wherein an aromatic ring having cation exchange group and alkoxy group is bonded to each methylene main chain having a crosslinked structure.

[9]

The membrane for direct liquid fuel cell, according to [7] or [8], wherein the crosslinked structure is formed by connecting methylene main chains with a diethylbenzene structure.

[10]

The membrane for direct liquid fuel cell, according to [7] or [8], wherein the alkoxy group is an alkoxy group having one to five carbon atoms.

[11]

The membrane for direct liquid fuel cell, according to [7] or [8], wherein the alkoxy group is bonded to the aromatic ring at the para-position relative to the carbon atom of aromatic ring bonding to the methylene main chain.

[12]

A membrane for direct liquid fuel cell, which comprises an ion exchange resin wherein an aromatic ring having at least one cation exchange group and at least one hydroxyl group is bonded to each methylene main chain having a crosslinked structure.

[13]

A membrane for direct liquid fuel cell, which comprises a porous membrane and an ion exchange resin filled in the pores of the porous membrane, the ion exchange resin being an ion exchange resin wherein an aromatic ring having at least one cation exchange group and at least one hydroxyl group is bonded to each methylene main chain having a crosslinked structure.

[14]

The membrane for direct liquid fuel cell, according to [12] or [13], wherein the crosslinked structure is formed by connecting methylene main chains with a diethylbenzene structure.

[15]

A membrane for direct liquid fuel cell, which comprises an ion exchange resin wherein an aromatic ring having cation exchange group and halogen atom is bonded to each methylene main chain having a crosslinked structure.

[16]

A membrane for direct liquid fuel cell, which is composed of a porous membrane and an ion exchange resin filled in the pores of the porous membrane, the ion exchange resin being an ion exchange resin wherein an aromatic ring having cation exchange group and halogen atom is bonded to each methylene main chain having a crosslinked structure.

[17]

The membrane for direct liquid fuel cell, according to [15] or [16], wherein the crosslinked structure is formed by connecting methylene main chains with a diethylbenzene structure.

[18]

The membrane for direct liquid fuel cell, according to [15] or [16], wherein the halogen atom is chlorine atom.

[19]

The membrane for direct liquid fuel cell, according to [15] or [16], wherein the halogen atom is bonded to the aromatic ring at the para-position relative to the carbon atom of aromatic ring bonding to the methylene main chain.

Effect of the Invention

In the method for producing the first membrane of the present invention, there is used, in a polymerizable composition for formation of cation exchange resin, a polymerizable monomer having methyl group at the para-position relative to the polymerizable group, as a polymerizable monomer for introducing a cation exchange group. Therefore, the cation exchange resin constituting the membrane obtained has appropriately high hydrophobicity and low permeability to liquid fuel. Further, although the reason is not clarified, the cation exchange resin obtained using a polymerizable monomer having methyl group at the para-position relative to the polymerizable group, as compared with when using a monomer having methyl group at the ortho- or meta-position, shows high blockage to liquid fuel permeation.

This cation exchange membrane has a certain ion exchange capacity and an appropriate crosslinking degree for suppressing the deformation (e.g. swelling) of membrane and possesses very high hydrophobicity. As a result, the cation exchange membrane obtained by the present method, when used as a membrane for direct liquid fuel cell, shows very low permeation to liquid fuel, particularly to methanol with no excessive increase in electric resistance of membrane. Thus, this membrane is a membrane for direct liquid fuel cell satisfying both high non-permeability to liquid fuel and high proton conductivity, which have been difficult to achieve.

In the method for producing the second membrane of the present invention, there is used, in a polymerizable composition for formation of cation exchange resin, a polymerizable monomer having at least one alkyl group having two or more carbon atoms, as a polymerizable monomer for introducing a cation exchange group. Therefore, the cation exchange resin constituting the membrane obtained has appropriately high hydrophobicity and effectively low permeability to liquid fuel.

This cation exchange membrane has a certain ion exchange capacity and an appropriate crosslinking degree for suppressing the deformation (e.g. swelling) of membrane and possesses very high hydrophobicity. As a result, the cation exchange membrane obtained by the present method, when used as a membrane for direct liquid fuel cell, shows very low permeation to liquid fuel, particularly methanol with no excessive increase in electric resistance of membrane. Thus, the membrane of the present invention is a membrane for direct liquid fuel cell satisfying both high non-permeability to liquid fuel and high proton conductivity, which have been difficult to achieve.

In the method for producing the third membrane of the present invention, there is used, in a polymerizable composition for formation of cation exchange resin, a polymerizable monomer having alkoxy group, as a polymerizable monomer for introducing a cation exchange group. The membrane obtained using this polymerizable monomer has appropriately high hydrophobicity, which allow to be low permeability to liquid fuel. Further, although the reason is not clarified, when there is used a polymerizable monomer having alkoxy group at the para-position relative to the polymerizable group, as compared with when there is used a monomer having alkoxy group at the ortho- or meta-position, there is obtained high blockage for permeation to liquid fuel.

In the method for producing the fourth membrane of the present invention, there is used, in a polymerizable composition for formation of cation exchange resin, a polymerizable monomer having alkoxy group or acyloxy group, as a polymerizable monomer for introducing a cation exchange group. These polymerizable compositions are polymerized to obtain a resin and, thereafter, the alkoxy group or acyloxy group bonded to the resin is hydrolyzed to covert the group to hydroxyl group. The polymerizable monomer is highly hydrophilic and easily compatible with other hydrophilic components. Therefore, it is not necessary to use a solvent for making the polymerizable composition a uniform solution. As a result, the membrane obtained by polymerizing such a polymerizable composition is not a gel-like material of low density which is formed in the presence of a solvent, but has a crosslinked structure of high density. Consequently, the membrane obtained shows low permeability to liquid fuel such as methanol or the like. Further, although the reason is not clarified, when there is used a polymerizable monomer having alkoxy group or acyloxy group at the para-position relative to the polymerizable group, as compared with when there is used a monomer having alkoxy group or acyloxy group at the ortho- or meta-position, the effect of blockage for liquid fuel permeation is high.

In the method for producing the fifth membrane of the present invention, there is used, in a polymerizable composition for formation of cation exchange resin, a polymerizable monomer having halogen atom, as a polymerizable monomer for introducing a cation exchange group. The membrane obtained using this polymerizable monomer has appropriately high hydrophobicity and low permeability to liquid fuel. Further, although the reason is not clarified, when there is used a polymerizable monomer having halogen atom at the para-position relative to the polymerizable group, as compared with when there is used a monomer having halogen atom at the ortho- or meta-position, the effect of blockage for liquid fuel permeation is high.

The direct liquid fuel cell produced using any of the membranes obtained by the above-mentioned production methods is low in cell internal resistance and suppressed in cross-over of liquid fuel such as methanol or the like and, therefore, can yield a high cell output.

BRIEF DESCRIPTION OF THE DRAWING

The drawing is a conceptual drawing showing the basic structure of solid polymer fuel cell.

EXPLANATION OF NUMERICAL SYMBOLS

1 is a cell separation wall; 2 is a fuel passage; 3 is an oxidizer gas passage; 4 is a fuel chamber side diffusion electrode; 5 is an oxidizer chamber side gas diffusion electrode; 6 is a solid polymer electrolyte membrane (a cation exchange membrane); 7 is a fuel chamber; and 8 is an oxidizer chamber.

BEST MODE FOR CARRYING OUT THE INVENTION (1) Method for Production of First Membrane for Direct Liquid Fuel Cell The first membrane for direct liquid fuel cell, of the present invention (hereinafter, the membrane may be abbreviated as first membrane) is a membrane wherein methyl group is bonded.

In the method for producing the first membrane, a particular polymerizable composition is filled in the pores formed in a porous membrane; then, the polymerizable composition is polymerized and cured to obtain a resin; thereafter, a cation exchange resin is introduced into the resin to obtain a first membrane.

(Polymerizable Composition)

The polymerizable composition which is a starting material in production of the first membrane, contains, as essential components, a) a monocyclic aromatic polymerizable monomer, b) a crosslinkable polymerizable monomer and c) a polymerization initiator.

a) Monocyclic Aromatic Polymerizable Monomer

The monocyclic aromatic polymerizable monomer is a compound represented by the following chemical formula (1), wherein one polymerizable group, at least one methyl group and at least one hydrogen atom are bonded to the benzene ring.

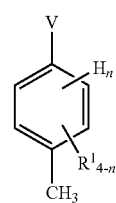

(1)

In the above chemical formula (1), $R^1$ is alkyl group having one to five carbon atoms, halogen atom, nitro group, cyano group or the like. As the alkyl group, there can be mentioned, for example, methyl group, ethyl group, n-propyl group, iso-propyl group, n-butyl group, isobutyl group, tert-butyl group and pentyl group. Of these alkyl groups, methyl group is preferred. As the halogen atom, there can be mentioned fluorine atom, chlorine atom, bromine atom and iodine atom. Of these halogen atoms, chlorine atom is preferred in view of the availability.

n is an integer of 1 to 4. n is preferably 3 or 4 because a high effect for blockage for liquid fuel permeation is obtained and the electric resistance of the membrane obtained is low. n is particularly preferably 4. A polymerizable monomer wherein n is 4, is preferred also from the availability. n is preferably 3 when $R^1$ is alkyl group.

V is a polymerizable group. As the polymerizable group, there is preferred an unsaturated bond-containing hydrocarbon group having two to five carbon atoms. Vinyl group, propenyl group, butylene group, etc. can be mentioned. Vinyl group is preferred particularly in view of the availability.

In the monocyclic aromatic polymerizable monomer represented by the chemical formula (1), at least one hydrogen atom is bonded to the aromatic ring. This hydrogen atom is exchanged with cation exchange group, as described later.

In the monocyclic aromatic polymerizable monomer represented by the chemical formula (1), at least one methyl group bonded to the benzene group is bonded at the para-position relative to the polymerizable group V.

As is clear from the data of Examples and Comparative Examples, described later, by using, as a starting material, a monocyclic aromatic polymerizable monomer wherein the polymerizable group V and the methyl group both bonded to the benzene ring are at a para-position relationship, there can be obtained a first membrane which shows high blockage for liquid fuel permeation and low electric resistance. When there is used a monocyclic aromatic polymerizable monomer wherein the polymerizable group V and the methyl group are not a para-position relationship, there is obtained no membrane which is good in both blockage for liquid fuel permeation and electric resistance.

As the monocyclic aromatic polymerizable monomer, there can be mentioned, for example, p-methylstyrene, 2,4-dimethylstyrene, 1,2,4-trimethylstyrene, 1,3,4-trimethylstyrene, 2-ethyl-4-methylstyrene, 2-propyl-4-methylstyrene, 2-butyl-4-methylstyrene, 2-chloro-4-methylstyrene and p-methyl-α-methylstyrene.

Of these, p-methylstyrene is particularly preferred because a membrane high in blockage for liquid fuel permeation and low in electric resistance can be obtained.

As to the content of the monocyclic aromatic polymerizable monomer in the polymerizable composition, there is no particular restriction. However, the content is preferably 10 to 99 mass %, particularly preferably 30 to 98 mass % of the total amount of the polymerizable monomers in the polymerizable composition. When the content of the monocyclic aromatic polymerizable monomer is in the above range, the cation exchange resin obtained is strikingly high in non-permeability to liquid fuel.

b) Crosslinkable Polymerizable Monomer

As the crosslinkable polymerizable monomer compounded in the polymerizable composition, monomers used in production of known ion exchange membranes can be used with no restriction. By compounding the crosslinkable polymerizable monomer in the polymerizable composition, the cation exchange resin obtained becomes a crosslinked type. An ion exchange resin of crosslinked type is essentially insoluble in solvents; therefore, it has no solubility in water or alcohol and shows minimum swelling, and cation exchange group can be introduced into the resin in a large amount. As a result, the present membrane is extremely low in electric resistance.

As specific examples of the crosslinkable polymerizable monomer, there can be mentioned for divinyl compound such as m-, p- or o-divinylbenzene, divinylsulfone, butadiene, chloroprene, isoprene, trivinylbenzenes, divinylnaphthalene, diallylamine, triallylamine and divinylpyridines.

As to the content of the crosslinkable polymerizable monomer in the polymerizable composition, there is no particular restriction. However, the content is preferably 1 to 40 mass %, particularly preferably 2 to 30 mass % of the total amount of the polymerizable monomers in the polymerizable composition. When the content of the crosslinkable polymerizable monomer in the polymerizable composition is controlled in the above range, the cation exchange resin obtained is low in permeability to liquid fuel, highly superior in prevention of swelling, etc., and is very low in electric resistance.

c) Polymerization Initiator

The polymerizable composition contains a polymerization initiator. As to the polymerization initiator, there is no particular restriction as long as it can initiator the polymerization of the monocyclic aromatic polymerizable monomer and the crosslinkable polymerizable monomer.

The polymerization initiator is preferably an organic peroxide. There can be mentioned, for example, radical polymerization initiators such as octanoyl peroxide, lauroyl peroxide, tert-butyl peroxy-2-ethylhexanoate, benzoyl peroxide, tert-butyl peroxyisobutyrate, tert-butyl peroxylaurate, tert-hexyl peroxybenzoate, di-tert-butyl peroxide and the like.

The content of the polymerization initiator is appropriately determined by an ordinary method depending upon the formulation of the polymerizable monomers used and the kind of the polymerization initiator used. Ordinarily, the content is preferably 0.1 to 20 parts by mass, more preferably 0.5 to 10 parts by mass per 100 parts by mass of the total of the polymerizable monomer components (including other polymerizable monomer described later, when it is used).

Incidentally, the polymerizable composition may contain other aromatic polymerizable monomer into which cation exchange group can be introduced, besides the monocyclic aromatic polymerizable monomer a) wherein one of the methyl groups is bonded at the para-position relative to the polymerizable group. As such other aromatic polymerizable monomer, there can be mentioned, for example, styrene, vinylxylene, α-methylstyrene, vinylnaphthalene, α-halogenated styrenes and acenaphthylenes. The content thereof is preferably 89 mass % or less, particularly preferably 68 mass % or less of the total amount of the polymerizable monomers in the polymerizable composition. 68 mass % or less is particularly preferred.

The polymerizable composition may further contain, besides the above-mentioned essential components, other component as necessary in a small amount which does not impair the object of the present invention, in order to adjust the physical properties (e.g. mechanical strength) and the reactivity (e.g. polymerizability). As such an optional component, there can be mentioned, for example, other polymerizable monomers such as acrylonitrile, acrolein, methyl vinyl ketone and the like; and plasticizers such as dibutyl phthalate, dioctyl phthalate, dimethyl isophthalate, dibutyl adipate, triethyl citrate, acetyl tributyl citrate, dibutyl sebacate and the like.

When a polymerizable monomer as other component is contained in the polymerizable composition, the content thereof is preferably 20 mass % or less, particularly preferably 10 mass % or less of the total amount of the polymerizable monomer components. The use amount of the plasticizer is preferably 50 parts by mass or less per 100 parts by mass of the total of the polymerizable monomer components.

(Porous Membrane)

In the method for producing the first membrane, the polymerizable composition is contacted with a porous membrane. Thereby, the polymerizable composition is filled in the pores of the porous membrane. Then, the polymerizable composition filled in the pores is polymerized and cured.

In the membrane for fuel cell, made of a cation exchange membrane thus produced using a porous membrane as a base material, the porous membrane functions as a reinforcing part and, therefore, a high physical strength can be obtained without causing an increase in electric resistance, etc.

As the porous membrane used as a base material, a known porous membrane can be used with no restriction as long as it is a porous membrane having pores inside and the two sides of membrane are communicated to each other by at least part of the pores.

The average pore diameter of the pores of the porous membrane is preferably 0.01 to 2 μm, particularly preferably 0.015 to 0.4 µm. When the pores are smaller than 0.01 µm, the amount of the cation exchange resin filled therein is small. When the pore diameter is larger than 2 µm, the alcohol permeability of the membrane is high.

The porosity of the porous membrane is preferably 20 to 95%, more preferably 30 to 90%.

The air permeability (JIS P 8117) is preferably 1,500 seconds or less, more preferably 1,000 seconds or less. By employing this gas permeability, the obtained membrane for fuel cell is low in electric resistance and can have a high physical strength.

The thickness is preferably 5 to 150 µm, more preferably 10 to 120 µm, particularly preferably 10 to 70 µm.

The surface smoothness is preferably 10 µm or less, more preferably 5 µm or less when expressed as roughness index. By employing a surface smoothness of the above range, the obtained membrane for fuel cell can have high non-permeability to alcohol.

The form of the porous membrane is not particularly restricted, and any form selected from porous film, woven fabric, non-woven fabric, paper, inorganic membrane, etc. can be used. As the material for porous membrane, there can be mentioned, for example, thermoplastic resin, thermosetting resin, inorganic material, and mixtures thereof. However, thermoplastic resin is preferred because it is easy to produce and has a high adhesivity to cation exchange resin described later.

As the thermoplastic resin, there can be mentioned, for example, polyolefin resin, for example, homopolymer or copolymer of α-olefin (e.g. ethylene, propylene, 1-butene, 1-pentene, 1-hexene, 3-methyl-1-butene, 4-methyl-1-pentene or 5-methyl-1-heptene); vinyl chloride resin such as polyvinyl chloride, vinyl chloride-vinyl acetate copolymer, vinyl chloride-vinylidene chloride copolymer, vinyl chloride-olefin copolymer or the like; fluoroplastic such as polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer, tetrafluoroethylene-ethylene copolymer or the like; and polyamide resin or polyimide resin such as nylon 6, nylon 66 or the like.

Of these, polyolefin resin is particularly preferred because it is superior in mechanical strength, chemical stability and chemical resistance and has good compatibility with hydrocarbon type ion exchange resin.

As the polyolefin resin, polyethylene resin or polypropylene resin is particularly preferred and polyethylene resin is most preferred.

The porous membrane can be obtained also by the methods described in, for example, JP1997-216964 A and JP2002-338721 A. Or, it can be obtained also as commercial products [e.g. "Hipore" of Asahi Chemical Industry Co., Ltd., "Upore" of Ube Industries, ltd., "Cetera" of Tonen Tapyrus Co., Ltd., "Excepor" of Nitto Denko Corporation, and "Hilet" of Mitsui Chemicals, Inc.].

(Contact of Polymerizable Composition with Porous Membrane)

As to the method for contact of polymerizable composition with porous membrane, there is no particular restriction as long as the polymerizable composition can penetrate into the pores of porous membrane. There can be mentioned, for example, a method of coating or spraying the polymerizable composition on the porous membrane or immersing the porous membrane in the polymerizable composition. When the porous membrane is immersed in the polymerizable composition and their contact is effected, the immersion time differs depending upon the kind of porous membrane or the formulation of polymerizable composition but is generally 0.1 second to ten and odds minutes.

(Polymerization)

The polymerizable composition filled in the pores of the porous membrane is then polymerized. The method of polymerization is not particularly restricted, and a known method can be appropriately employed depending upon the formulation of the polymerizable composition used and the kind of the polymerization initiator used. When the above-mentioned organic peroxide is used as the polymerization initiator, a polymerization method by heating (thermal polymerization) is generally used. This method is preferred to other methods because it is easy to carry out and relatively uniform polymerization can be conducted. In polymerization, it is preferred to cover the porous membrane in which the polymerizable composition has been filled, with a film such as polyester film or the like, in order to prevent the hindrance of polymerization by oxygen and also obtain a smooth surface, and then conduct polymerization. By covering the porous membrane with a film, an excessive portion of the polymerizable composition is removed from the porous membrane and a thin and uniform membrane for fuel cell can be produced.

In the case of thermal polymerization, the polymerization temperature is not particularly restricted and known temperature conditions may be selected appropriately. However, the polymerization temperature is generally 50 to 150° C., preferably 60 to 120° C. The polymerization time is preferably 10 minutes to 10 hours.

(Introduction of Cation Exchange Group)

Into the membrane-shaped polymer produced as above, in which a resin composed of a polymer of the polymerizable composition is filled in the pores of the porous membrane, is then introduced a cation exchange group.

The cation exchange group is introduced into the benzene ring of the above resin filled in the pores of the porous membrane. Incidentally, this benzene ring is derived from the benzene ring of the monocyclic aromatic polymerizable monomer compounded in the polymerizable composition.

As the cation exchange group introduced into the benzene ring, a known cation exchange group is employed with no particular restriction. As specific examples, there can be mentioned sulfonic group, carboxyl group and phosphonic group. Sulfonic group, which is highly acidic, is particularly preferred because the membrane obtained is low in electric resistance.

As the method for introducing a sulfonic group into the benzene ring, there can be mentioned, for example, a method of reacting a sulfonating agent such as concentrated sulfuric acid, fuming sulfuric acid, sulfur dioxide, chlorosulfonic acid or the like, with the above-produced membrane-shaped polymer.

As the method for introducing a phosphonic group into the benzene ring, there can be mentioned, for example, a method of reacting phosphorus trichloride with a membrane-shaped polymer having halogenated alkyl group, in the presence of anhydrous aluminum chloride, followed by hydrolysis in an aqueous alkaline solution.

As the method for introducing a carboxyl group into the benzene ring, there can be mentioned, for example, a method of contacting with a halogen gas in the presence of a catalyst (e.g. iron halide) to conduct halogenation, further reacting with an alkyl lithium, thereafter reacting with carbon dioxide.

These methods for introducing a cation exchange group are per se known.

(Membrane for Direct Liquid Fuel Cell)

The thus-obtained cation exchange membrane wherein a membrane, is as necessary washed and cut, and is used as a membrane for direct liquid fuel cell according to an usual method.

The membrane for direct liquid fuel cell, produced by the method for production of the first membrane has a high cation exchange capacity of ordinarily 0.1 to 3 mmol/g, particularly 0.1 to 2 mmol/g when measured by an ordinary method. Therefore, it has a high cell output and also is sufficiently low in liquid fuel permeability and electric resistance. Further, since using the polymerizable composition of the above formulation, the membrane of the present invention has a water content of ordinarily 5 to 90%, more preferably 10 to 80%, and hardly causes an increase in electric resistance by drying, that is, a decrease in proton conductivity. Furthermore, the membrane is insoluble in liquid fuel. The electric resistance is ordinarily very small such as 0.45 $\Omega \cdot cm^2$ or less, further 0.25 $\Omega \cdot cm^2$ or less when expressed as an electric resistance in a 3 mol/L aqueous sulfuric acid solution. Moreover, the liquid fuel permeability is extremely small and, for example, the permeability of methanol through the membrane when the membrane is in contact with 100% methanol at 25° C., is ordinarily 1,000 $g/m^2 \cdot hr$ or less, particularly 10 to 700 $g/m^2 \cdot hr$.

Thus, the membrane for fuel cell, obtained by the method for production of the first membrane is low in electric resistance and small in liquid fuel permeability; therefore, when used as a membrane for direct liquid fuel cell, the membrane can effectively prevent the diffusion of liquid fuel fed into fuel chamber, into opposite chamber through the membrane and can provide a cell of high output. A direct liquid fuel cell employing this membrane has generally a basic structure of the drawing, but this membrane can naturally be applied also to a direct liquid fuel cell having other known structure.

The liquid fuel is methanol most generally and, when methanol is used, the effect of the present invention is exhibited most strikingly. However, a similar excellent effect is exhibited also when ethanol, ethylene glycol, dimethyl ether, hydrazine or the like is used. Further, not only a liquid fuel but also a gas (e.g. hydrogen gas) can be used.

(2) Method for Production of Second Membrane for Direct Liquid Fuel Cell

The second membrane for direct liquid fuel cell, of the present invention (hereinafter, the membrane may be abbreviated as second membrane) is a membrane wherein alkyl group having two or more carbon atoms is bonded.

In the method for producing the second membrane, a particular polymerizable composition is filled in the pores formed in a porous membrane; then, the polymerizable composition is polymerized and cured to obtain a resin; thereafter, a cation exchange group is introduced into the resin to obtain a second membrane. The difference of the production method of second membrane from the production method of first membrane of above (1) for direct liquid fuel cell lies in the difference of the two polymerizable compositions each used as a starting material. Other than that, the production method (1) of second membrane is the same as the production method of first membrane for direct liquid fuel cell. Therefore, description is made below only on the polymerizable composition and no other description is made.

(Polymerizable Composition)

The polymerizable composition which is a starting material in production of the present membrane, contains, as essential components, a) an aromatic polymerizable monomer, b) a crosslinkable polymerizable monomer and c) a polymerization initiator.

Of the essential components, the crosslinkable polymerizable monomer b) and the polymerization initiator c) are the same as those described in detail in (1) Method for production of first membrane for direct liquid fuel cell; therefore, the description thereof is not made and description is made below on the aromatic polymerizable monomer a).

a) Aromatic Polymerizable Monomer

The aromatic polymerizable monomer is a compound wherein one polymerizable group, at least one alkyl group having two or more carbon atoms and at least one hydrogen atom are bonded to the aromatic ring.

As the aromatic ring, there can be mentioned monocyclic aromatic rings which having a benzene structure and polycyclic aromatic rings (e.g. naphthalene and anthracene) which having a structure formed by condensation of a plurality of monocyclic aromatic rings. Of these, monocyclic aromatic rings are preferred because they are easy to procure and can provide a membrane high in blockage for liquid fuel permeation and appropriately low in electric resistance, and benzene ring is particularly preferred.

The alkyl group bonded to the aromatic ring has carbon atoms of preferably 2 to 15 and the hydrogen atom(s) of the alkyl group may be substituted by halogen atom(s). An alkyl group having 2 to 15 carbon atoms is preferred to methyl group (having 1 carbon atom) because higher blockage for liquid fuel permeation is obtained. As the alkyl group, there can be mentioned, for example, ethyl group, n-propyl group, isopropyl group, n-butyl group, isobutyl group, tert-butyl group, n-heptyl group, n-hexyl group, n-pentyl group, n-octyl group, n-nonyl group, n-decanyl group, stearyl group, and groups obtained by substituting the hydrogen atom(s) of these groups by halogen atom(s). Of these alkyl groups, an alkyl group of 2 to 15 carbon atoms is preferred because high blockage for liquid fuel permeation is obtained and the electric resistance of the membrane obtained can be maintained in a range ordinarily preferred during use, and an alkyl group of 2 to 10 carbon atoms is particularly preferred. Also, a straight chain alkyl group is preferred to a branched chain alkyl group because very high blockage for liquid fuel permeation is obtained. As the halogen atom, there can be mentioned fluorine atom, chlorine atom, bromine atom and iodine atom. Of these halogen atoms, chlorine atom is preferred in view of the availability.

The maximum number of the alkyl groups bonded to the aromatic ring differs depending upon the number of the rings possessed by the aromatic ring. Irrespective of the number of the rings possessed by the aromatic ring, it is necessary that one polymerizable group and at least one hydrogen atom are bonded to the aromatic ring. As described later, this hydrogen atom is exchanged with cation exchange group.

The polymerizable group is preferably an unsaturated hydrocarbon group having 2 to 5 carbon atoms, and there can be mentioned, for example, vinyl group, propenyl group and butylene group. Vinyl group is particularly preferred in view of the availability.

In the aromatic polymerizable monomer, it is preferred that at least one of the alkyl groups bonded to the aromatic ring is bonded at the para-position relative to the polymerizable group.

Incidentally, as long as each of the alkyl group of 2 or more carbon atoms, the polymerizable group and the hydrogen atom is bonded to the aromatic ring in a specified number, other substituent not hindering the effect of the present invention may be bonded to the remaining positions of the aromatic ring. As such other substituent, there can be mentioned, for example, halogen atom, cyano group and nitro group.

As the monocyclic aromatic polymerizable monomer, there can be mentioned, for example, p-ethylstyrene, p-(n-propyl)styrene, p-(isopropyl)styrene, p-(n-butyl)styrene, p-(isobutyl)styrene, p-(tert-butyl)styrene, p-(n-heptyl)styrene, p-(n-hexyl)styrene, p-(n-pentyl)styrene, p-(n-octyl)styrene, p-(n-nonyl)styrene, 2,4-diethylstyrene, 3,4-diethylstyrene, 2,3,4-triethylstyrene, 2-ethyl-4-methylstyrene, p-ethyl-α-methylstyrene and p-chloroethylstyrene.

Of these, particularly preferred are p-ethylstyrene, p-(n-propyl)styrene, p-(n-butyl)styrene, p-(tert-butyl)styrene, p-(n-heptyl)styrene, p-(n-hexyl)styrene, p-(n-pentyl)styrene and p-(n-octyl)styrene because the membrane obtained has high blockage for liquid fuel permeation and electric resistance of appropriate range.

As to the content of the aromatic polymerizable monomer in the polymerizable composition, there is no particular restriction. However, the content of the aromatic polymerizable monomer in the polymerizable composition is preferably 10 to 99 mol %, more preferably 40 to 98 mol %. By controlling the content of the aromatic polymerizable monomer in the above range, the cation exchange resin obtained is more striking in non-permeability to liquid fuel.

The membrane for direct liquid fuel cell, produced by the method for production of the second membrane has a high cation exchange capacity of ordinarily 0.1 to 3 mmol/g, particularly 0.1 to 2 mmol/g when measured by an usual method. Therefore, it has a high cell output and also is sufficiently low in liquid fuel permeability and electric resistance. Other properties are the same as described in the method for production of the first membrane.

(3) Third Membrane for Direct Liquid Fuel Cell, and Production Method Therefor

The third membrane for direct liquid fuel cell, of the present invention (hereinafter, the membrane may be abbreviated as third membrane) is a membrane wherein alkoxy group is bonded. This membrane has two kinds, i.e. a single type membrane and a composite type membrane.

(Single Type Membrane for Direct Liquid Fuel Cell)

The single type membrane for direct liquid fuel cell is composed of a cation exchange resin membrane schematically represented by the following chemical formula (2).

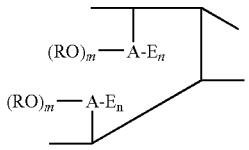

(2)

In the chemical formula (2), A is an aromatic ring and is bonded to a methylene main chain represented by a straight line. As the aromatic ring, there are a monocyclic type and a polycyclic type formed by condensation of a plurality of aromatic rings. Specifically, there can be mentioned benzene ring, naphthalene ring, anthracene ring, etc.

R is alkyl and the number of carbon atoms thereof is preferably 1 to 5, more preferably 1 to 3, particularly preferably 1.

m is the number of the alkoxy groups bonded to the aromatic ring A. m is 1 or more, preferably 1 to 4, more preferably 1 to 2.

As the alkoxy group, there can be mentioned, for example, methoxy group, ethoxy group, n-propoxy group, isopropoxy group, n-butoxy group, isobutoxy group, tert-butoxy group and pentoxy group.

E is a cation exchange group. As the cation exchange group, a known cation exchange group can be employed with no particular restriction. Specifically, there can be mentioned sulfonic group, carboxyl group, phosphonic group, etc. Sulfonic group, which is strongly acidic, is particularly preferred because the membrane obtained is low electric resistance. n is the number of cation exchange groups bonded to the aromatic ring, and is an integer of 1 or more. n is preferably 1 to 2.

m+n<=W Here, W is a number which is (the number of hydrogen atoms bonded to substituent-free aromatic ring−1). Therefore, W=6−1=5 when the aromatic ring is benzene ring; W=8−1=7 when the aromatic ring is naphthalene ring; and W=8−1=7 when the aromatic ring is anthracene ring.

The cation exchange resin represented by the above-shown chemical formula (2) has a crosslinked structure which bonds methylene main chains to each other. In the chemical formula (2), a straight line of vertical direction, connecting two methylene main chains each shown by a horizontal straight line indicates a crosslinking chain schematically.

As to the crosslinking chain, there is no particular restriction, and there can be any chain as long as it can crosslink the methylene main chains to each other. The crosslinking chain is preferably selected by considering the non-permeability of liquid fuel through membrane and the reduction in electric resistance. In general, there is employed a crosslinking chain having a structure derived from a crosslinking agent widely used in polymerization. A preferred crosslinking chain is, for example, one derived from divinylbenzene.

The chemical structure of a cation exchange resin particularly preferable as the third membrane for direct liquid fuel cell is shown in the following chemical formula (3).

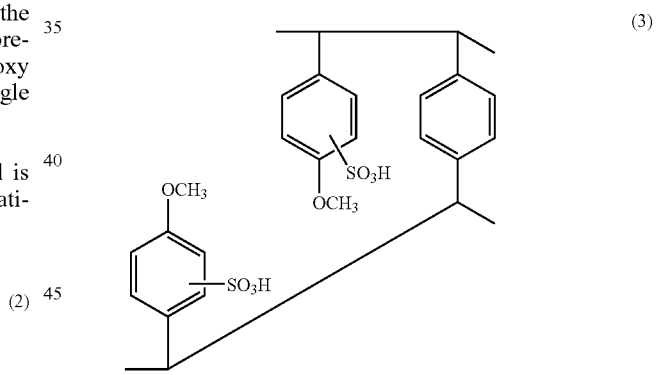

(3)

In the cation exchange resin represented by the chemical formula (3), the molar ratio of the diethylbenzene structure unit as a crosslinking chain and the methoxysulfonylbenzene unit is preferably 1:99 to 40:60, more preferably 2:98 to 30:70. The molar ratio of sulfonic group and methoxy group is 1:1.

The presence of alkoxy group in the cation exchange resin can be confirmed by infrared spectrometry. Specifically, the presence can be confirmed by the absorption peaks of 1,030 cm$^{-1}$ and 1,245 cm$^{-1}$ which are characteristic absorptions of ether structure —C—O—C—. The amount of alkoxy group present can be determined quantitatively by adding an appropriate internal standard substance into the cation exchange resin.

In the third membrane of single type for direct liquid fuel cell, the cation exchange resin represented by the chemical formula (2) is converted to a membrane in a thickness of 10 to 100 μm.

(Composite Type Membrane for Direct Liquid Fuel Cell)

The third membrane of composite type for direct liquid fuel cell comprises a porous membrane used as a base material and a cation exchange resin represented by the chemical formula (2), filled in the pores of the porous membrane.

In the membrane for fuel cell, composed of a cation exchange membrane produced using a porous membrane as a base material, the porous membrane functions as a reinforcing part and, therefore, a high physical strength can be obtained without causing an increase in electric resistance, etc.

Porous Membrane

As the porous membrane which is used as a base material, a known porous membrane can be used with no restriction as long as it is a porous membrane having pores inside and the two sides of membrane are communicated to each other by at least part of the pores. As such a porous membrane, there can be used per se the porous membrane described in (Porous membrane) of (1) Method for production of first membrane for direct liquid fuel cell. Therefore, no description is made on the porous membrane.

The amount of the cation exchange resin filled in the porous membrane is preferably 10 to 90 mass parts, more preferably 20 to 70 mass parts per 100 mass parts of the porous membrane.

The membrane of composite type for direct liquid fuel cell has a high cation exchange capacity of ordinarily 0.1 to 3 mmol/g, particularly 0.3 to 2.5 mmol/g when measured by an usual method. Therefore, it has a high cell output and also is sufficiently low in liquid fuel permeability and electric resistance. Further, since using the polymerizable composition of the above formulation, the membrane of composite type has a water content of ordinarily 5 to 90%, more preferably 10 to 80%, and hardly causes an increase in electric resistance by drying, that is, a decrease in proton conductivity. Furthermore, the membrane is insoluble in liquid fuel. The membrane resistance measured by the method shown in Examples described later is extremely small at 0.40 $\Omega \cdot cm^2$ or less, further at 0.25 $\Omega \cdot cm^2$ or less. The liquid fuel permeability is extremely small and the permeability of methanol when measured by the method of Examples described later is ordinarily 1,000 $g/m^2 \cdot hr$ or less and further is in a range of 10 to 700 $g/m^2 \cdot hr$. This membrane of composite type is very advantageous particularly in that the permeability to liquid fuel can be kept low even in a range of small membrane resistance where the permeability to liquid fuel becomes large in conventional membranes. Specifically explaining, a low methanol permeability of 250 $g/m^2 \cdot hr$ or less can be kept in a range of membrane resistance of 0.10 $\Omega \cdot cm^2$ or less where the methanol permeability ordinarily increases to 300 $g/m^2 \cdot hr$ or more.

Thus, the membrane of composite type for fuel cell is low in electric resistance and also small in liquid fuel permeability; therefore, when used as a membrane for direct liquid fuel cell, the membrane can effectively prevent the diffusion of liquid fuel fed into fuel chamber, into opposite chamber through the membrane and consequently can provide a cell of high output.

Description is made below in detail on the method for production of the third membrane for direct liquid fuel cell.
(Method for Production of Single Type Membrane for Direct Liquid Fuel Cell)

In the method for production of the single type membrane for direct liquid fuel cell, of the present invention, a particular polymerizable composition is prepared and polymerized/cured into a membrane shape of given thickness to obtain a resin membrane; and a cation exchange group is introduced into the resin membrane to obtain a single type membrane for direct liquid fuel cell.

Polymerizable Composition

The polymerizable composition, which is a starting material used for producing a single type membrane, contains, as essential components, a) an aromatic polymerizable monomer, b) a crosslinkable polymerizable monomer and c) a polymerization initiator.

Of the essential components, the crosslinkable polymerizable monomer b) and the polymerization initiator c) are the same as those described in detail in (1) Method for production of first membrane for direct liquid fuel cell; therefore, description thereof is not made and description of the aromatic polymerizable monomer a) is made below.

a) Aromatic Polymerizable Monomer

The aromatic polymerizable monomer is a compound represented by the following chemical formula (4), wherein one polymerizable group, at least one alkoxy group and at least one hydrogen atom are bonded to the aromatic ring.

(4)

In the above chemical formula (4), V is a polymerizable group. The polymerizable group is preferably an unsaturated hydrocarbon group having 2 to 5 carbon atoms. Vinyl group, propenyl group, butylene group, etc. can be mentioned. Vinyl group is particularly preferred in view of the availability.

A is an aromatic ring. As the aromatic ring, there are a monocyclic type and a polycyclic type wherein a plurality of aromatic rings are condensed. Specifically, there can be mentioned, for example, benzene ring, naphthalene ring, anthracene ring and derivatives thereof.

R is an alkyl group having 1 to 5 carbon atoms. As the alkyl group, there can be mentioned, for example, methyl group, ethyl group, n-propyl group, isopropyl group, n-butyl group, isobutyl group, tert-butyl group and pentyl group. Of these, alkyl groups of 1 to 2 carbon atoms are preferred and methyl group is preferred particularly.

p is an integer of 1 to 4. p is preferably 1 or 2 because the membrane obtained is high in blockage for liquid fuel permeation and is low in electric resistance, and is particularly preferably 1.

q is the number of the hydrogen atoms bonded to the aromatic ring. In the aromatic polymerizable monomer represented by the chemical formula (4), at least one hydrogen atom is bonded to the aromatic ring. This hydrogen atom is exchanged with a cation exchange group, as described later.

The sum of p and q is "the number of hydrogen atoms bondable to unsubstituted aromatic ring–1".

In the aromatic polymerizable monomer represented by the chemical formula (4), it is preferred that at least one of the alkoxy groups bonded to the aromatic ring is at the para-position relative to the polymerizable group V. Owing to the bonding of alkoxy group at the para-position, the membrane obtained is high in blockage for liquid fuel permeation and is further low in electric resistance.

As the monocyclic aromatic polymerizable monomer, there can be mentioned, for example, p-methoxystyrene, 2,4-dimethoxystyrene, p-ethoxystyrene, 2,4-diethoxystyrene, p-propoxystyrene, 2,4-dipropoxystyrene, p-butoxystyrene, 2,4-dibutoxystyrene, p-tert-butoxystyrene, 2,4-di-tert-butoxystyrene, p-pentoxystyrene and 2,4-dipentoxystyrene.

As the bicyclic aromatic polymerizable monomer, there can be mentioned, fore example, 1-methoxy-5-vinylnaphthalene and 2-methoxy-6-vinylnaphthalene.

As the tricyclic aromatic polymerizable monomer, there can be mentioned, for example, 1-methoxy-10-vinylanthracene, 8-methoxy-10-vinylanthracene and 1-mehtoxy-5-vinylanthracene.

Of these compounds, p-methoxystyrene is particularly preferred because the membrane obtained is high in blockage for liquid fuel permeation and is low in electric resistance.

As to the content of the aromatic polymerizable monomer in the polymerizable composition, there is no particular restriction. However, the content is preferably 10 to 99 mol %, more preferably 20 to 98 mol % of the total amount of the polymerizable monomers contained in the polymerizable composition. By controlling the content of the aromatic polymerizable monomer in the above range, the cation exchange resin obtained shows more striking non-permeability to liquid fuel.

Polymerization

The above-prepared polymerizable composition is polymerized under keeping a membrane shape of given thickness. The polymerization method used is the same as described in (1) Method for production of first membrane for direct liquid fuel cell.

Introduction of Cation Exchange Group

Into the thus-produced resin membrane composed of a polymer of polymerizable composition is then introduced a cation exchange group.

The cation exchange group is introduced into the aromatic ring of the resin membrane. Incidentally, this aromatic ring is derived from the aromatic ring of the aromatic polymerizable monomer compounded in the polymerizable composition.

The method for introduction of cation exchange group is the same as that described in (1) Method for production of first membrane for direct liquid fuel cell.

(Method for Production of Composite Type Membrane for Direct Liquid Fuel Cell)

In the method for production of composite type membrane for direct liquid fuel cell, a certain polymerizable composition is filled in the pores of a porous membrane; the polymerizable composition is polymerized and cured to obtain a resin; and a cation exchange group is introduced into the resin cured to produce the present membrane.

Polymerizable Composition

The polymerizable composition, which is a starting material in production of the present membrane, is the same as used in production of the above-mentioned single type membrane for direct liquid fuel cell. Therefore, no description thereof is made.

Porous Membrane

In the production method of the present invention, the above-mentioned polymerizable composition is contacted with a porous membrane. Thereby, the polymerizable composition is filled in the pores of the porous membrane. Then, the polymerizable composition filled in the pores is polymerized and cured.

In the membrane for fuel cell, composed of a cation exchange membrane thus produced using a porous membrane as a base material, the porous membrane functions as a reinforcing part and, therefore, a high physical strength can be obtained without causing an increase in electric resistance, etc.

The porous membrane used as a base material is the same as the porous membrane described in the first membrane for direct liquid fuel cell.

Contact of Polymerizable Composition with Porous Membrane

As the method for contact of polymerizable composition with porous membrane, the contact method described in the first membrane for direct liquid fuel cell can be used as it is.

Polymerization

By the contact of the above-mentioned polymerizable composition with the above-mentioned porous membrane, the polymerizable composition is filled in the pores of the porous membrane. The polymerizable composition is then polymerized. The method for polymerization is the same as that described in the first membrane of direct type.

Introduction of Cation Exchange Group

Into the above-produced membrane-shaped polymer wherein a resin (which is a polymer of a polymerizable composition) is filled in the pores of a porous membrane, is then introduced a cation exchange group.

The cation exchange group is introduced into the aromatic ring of the resin filled in the pores of the porous membrane. Incidentally, the aromatic ring is derived from the aromatic ring of the aromatic polymerizable monomer contained in the polymerizable composition.

The cation exchange group introduced into the aromatic ring and the method for introduction of the group were described above in detail. Therefore, their description is not made.

(4) Fourth Membrane for Direct Liquid Fuel Cell and Production Method Therefor

The fourth membrane for direct liquid fuel cell, of the present invention (hereinafter, the membrane may be abbreviated as fourth membrane) is a membrane wherein hydroxyl group is bonded. The fourth membrane for direct liquid fuel cell has two types, i.e. single type and composite type, as described later.

(Single Type Membrane for Direct Liquid Fuel Cell)

The single type membrane for direct liquid fuel cell is composed of a cation exchange resin schematically represented by the following chemical formula (5).

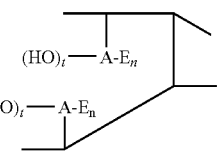

(5)

In the chemical formula (5), A is an aromatic ring and is bonded to a methylene main chain represented by a straight line. As the aromatic ring, there are a monocyclic type and a polycyclic type formed by condensation of a plurality of aromatic rings. Specifically, there can be mentioned benzene ring, naphthalene ring, anthracene ring, etc.

$t$ is the number of the hydroxyl groups bonded to the aromatic ring A. $t$ is 1 or more, preferably 1 to 4, more preferably 1 to 2.

When $t$ is 5 or more, the permeability to liquid fuel is large. The hydroxyl group is particularly preferably bonded at the para-position relative to the carbon atom of aromatic ring bonding to the methylene main chain, in view of the blockage for liquid fuel permeation.

E is a cation exchange group. As the cation exchange group, a known cation exchange group can be employed with no particular restriction. Specifically, there can be mentioned sulfonic group, carboxyl group, phosphonic group, etc. Sulfonic group, which is strongly acidic, is particularly preferred because the membrane obtained is low electric resistance. n is the number of cation exchange groups E bonded to the aromatic ring, and is an integer of 1 or more. n is preferably 1 to 2.

t+n<=W Here, W is a number which is (the number of hydrogen atoms bonded to substituent-free aromatic ring−1). For example, W=6−1=5 when the aromatic ring is benzene ring; W=8−1=7 when the aromatic ring is naphthalene ring; and W=8−1=7 when the aromatic ring is anthracene ring.

The cation exchange resin represented by the above-shown chemical formula (5) has a crosslinked structure whereby methylene main chains are bonded to each other. In the chemical formula (5), a straight line of vertical direction, connecting two methylene main chains which are shown by a horizontal straight lines indicates a crosslinking chain schematically.

As to the crosslinking chain, there is no particular restriction, and there can be any chain as long as it can crosslink the methylene main chains to each other. The crosslinking chain is preferably selected by considering the non-permeability of liquid fuel through membrane and the reduction in electric resistance. In general, there is employed a crosslinking chain having a structure derived from a crosslinking agent widely used in polymerization. A preferred crosslinking chain is, for example, one derived from divinylbenzene.

The chemical structure of a cation exchange resin particularly preferable as the single type membrane for direct liquid fuel cell is shown in the following chemical formula (6).

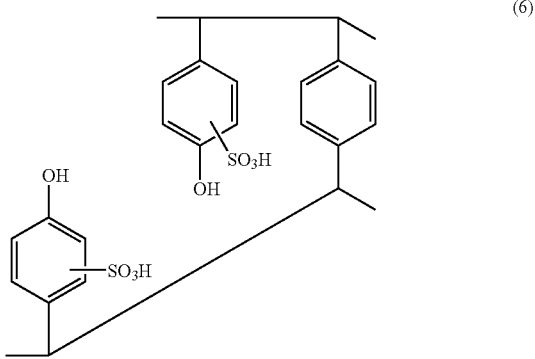

(6)

In the cation exchange resin represented by the chemical formula (6), the molar ratio of the diethylbenzene structure unit as a crosslinking chain and the sulfonylhydroxystyrene unit is preferably 1:99 to 40:60, more preferably 2:98 to 30:70. The molar ratio of sulfonic group and hydroxyl group is 1:1.

In the single type membrane for direct liquid fuel cell, the cation exchange resin represented by the chemical formula (6) is formed in a thickness of 20 to 100 μm.

(Composite Type Membrane for Direct Liquid Fuel Cell)

The composite type membrane for direct liquid fuel cell, of the present invention comprises a porous membrane used as a base material and a cation exchange resin represented by the chemical formula (6), filled in the pores of the porous membrane.

In the membrane for fuel cell, composed of a cation exchange membrane produced using a porous membrane as a base material, the porous membrane functions as a reinforcing part and, therefore, a high physical strength can be obtained without causing an increase in electric resistance, etc.

Porous Membrane

The porous membrane used as a base material has pores inside and the two sides of membrane are communicated to each other by at least part of the pores. As such a porous membrane, there can be used per se the porous membrane described in (Porous membrane) of (1) Method for production of first membrane for direct liquid fuel cell. Therefore, no description is made on the porous membrane.

The membranes of direct type and composite type both for direct liquid fuel cell, of the present invention have a high cation exchange capacity of ordinarily 0.1 to 3 mmol/g, particularly 0.1 to 2 mmol/g when measured by a usual method. Therefore, they have a high cell output and also are sufficiently low in liquid fuel permeability and electric resistance. Since using a polymerizable composition of the formulation described later, these membranes have a water content of ordinarily 5 to 90%, more preferably 10 to 80%, and hardly cause an increase in electric resistance by drying, that is, a decrease in proton conductivity.

These membranes are insoluble in liquid fuel. The electric resistances are very small at 0.45 $\Omega \cdot cm^2$ or less, further at 0.25 $\Omega \cdot cm^2$ or less when expressed as an electric resistance in a 3 mol/L aqueous sulfuric acid solution. Further, their liquid fuel permeabilities are extremely small and, for example, the permeabilities of methanol through membrane when the membranes are in contact with 100% methanol at 25° C., are ordinarily 1,000 $g/m^2 \cdot hr$ or less, particularly 10 to 700 $g/m^2 \cdot hr$.

Thus, the third membrane for fuel cell is low in electric resistance and small in liquid fuel permeability; therefore, when used as a membrane for direct liquid fuel cell, the membrane can effectively prevent the diffusion of liquid fuel fed into fuel chamber, into opposite chamber through the membrane and can provide a cell of high output.

Description is made below in detail on the method for production of the membranes of single type and composite type both for direct liquid fuel cell.

(Method for Production of Single Type Membrane for Direct Liquid Fuel Cell)

In the method for production of the single type membrane for direct liquid fuel cell, an usual polymerizable composition is prepared and polymerized/cured into a membrane shape of given thickness to obtain a resin membrane; a hydroxyl group is introduced into the resin membrane; then, a cation exchange group is introduced to obtain a single type membrane for direct liquid fuel cell (hereinafter, the membrane may be abbreviated as single type membrane).

Polymerizable Composition

The polymerizable composition, which is a starting material used for producing a single type membrane, contains, as essential components, a) an aromatic polymerizable monomer, b) a crosslinkable polymerizable monomer and c) a polymerization initiator.

Of the essential components, the crosslinkable polymerizable monomer b) and the polymerization initiator c) are the same as those described in detail in (1) Method for production of first membrane for direct liquid fuel cell; therefore, description thereof is not made and description of the aromatic polymerizable monomer a) is made below.

a) Aromatic Polymerizable Monomer

The aromatic polymerizable monomer is a compound wherein at least one polymerizable group, at least one alkoxy group or acyloxy group, and at least one hydrogen atom are bonded to the aromatic ring. Ordinarily, a compound represented by the following chemical formula (7) is used.

(7)

In the above chemical formula (7), V is a polymerizable group. The polymerizable group is preferably an unsaturated hydrocarbon group having 2 to 5 carbon atoms. Vinyl group, propenyl group, butylene group, etc. can be mentioned. Vinyl group is particularly preferred in view of the availability.

A is an aromatic ring. As the aromatic ring, there are a monocyclic type and a polycyclic type wherein a plurality of aromatic rings are condensed. Specifically, there can be mentioned, for example, benzene ring, naphthalene ring, anthracene ring and derivatives thereof.

L is an alkoxy group or acyloxy group having 1 to 5 carbon atoms.

As the alkoxy group, there can be mentioned, for example, methoxy group, ethoxy group, n-propoxy group, isopropoxy group, n-butoxy group, isobutoxy group, tert-butoxy group and pentoxy group. Of these alkoxy groups, alkoxy groups of 1 to 2 carbon atoms are preferred and methoxy group is particularly preferred.

Acyloxy group is a functional group represented by the following chemical formula (8).

Here, $R^1$ is an alkyl group of 1 to 5 carbon atoms.

As specific examples of the acyloxy group, there can be mentioned acetoxy group, ethyloxy group, n-propyloxy group, n-butyloxy group, isobutyloxy group, tert-butoxy group, butyloxy group and pentyloxy group. Of these acyloxy groups, acyloxy groups of 1 to 2 carbon atoms are preferred and acetoxy group is preferred particularly.

r is an integer of 1 to 4. r is preferably 1 or 2 because the membrane obtained is high in blockage for liquid fuel permeation and low in electric resistance, and is particularly preferably 1.

s is the number of the hydrogen atoms bonded to the aromatic ring. In the aromatic polymerizable monomer represented by the chemical formula (7), at least one hydrogen atom is bonded to the aromatic ring. This hydrogen atom is exchanged with a cation exchange group, as described later.

The sum of r and s is "the number of hydrogen atoms bondable to unsubstituted aromatic ring–1".

In the Aromatic polymerizable monomer represented by the chemical formula (7), it is preferred that at least one of the alkoxy groups or acyloxy groups bonded to the aromatic ring is at the para-position relative to the polymerizable group V. Owing to the bonding of alkoxy group or acyloxy group at the para-position, the membrane obtained is high in blockage for liquid fuel permeation and is low in electric resistance.

As the monocyclic aromatic polymerizable monomer having alkoxy group, there can be mentioned, for example, p-methoxystyrene, 2,4-dimethoxystyrene, p-ethoxystyrene, and 2,4-diethoxystyrene.

As the monocyclic aromatic polymerizable monomer having acyloxy group, there can be mentioned, for example, p-acetoxystyrene, 2,4-diacetoxystyrene, p-ethyloxystyrene, 2,4-diethyloxystyrene and 2-ethyloxy-4-acetoxystyrene.

As the bicyclic aromatic polymerizable monomer having alkoxy group, there can be mentioned, for example, 1-methoxy-5-vinylnaphthalene, 1-ethoxy-5-vinylnaphthalene, 2-methoxy-6-vinylnaphthalene and 2-ethoxy-6-vinylnaphthalene.

As the bicyclic aromatic polymerizable monomer having acyloxy group, there can be mentioned, for example, 1-acetoxy-5-vinylnaphthalene, 1-ethyloxy-5-vinylnaphthalene, 2-acetoxy-6-vinylnaphthalene and 2-ethyloxy-6-vinylnaphthalene.

As the tricyclic aromatic polymerizable monomer having alkoxy group, there can be mentioned, for example, 1-methoxy-5-vinylanthracene, 1-ethoxy-5-vinylanthracene, 2-methoxy-6-vinylanthracene and 2-ethoxy-6-vinylanthracene.

As the tricyclic aromatic polymerizable monomer having acyloxy group, there can be mentioned, for example, 1-acetoxy-5-vinylanthracene, 1-ethyloxy-5-vinylanthracene, 2-acetoxy-6-vinylanthracene and 2-ethyloxy-6-vinylanthracene.

A tetra- or higher cyclic aromatic polymerizable monomer can also be used, and there can be mentioned, for example, 1-methoxy-7-vinyltetracene, 1-ethoxy-7-vinyltetracene, 2-methoxy-8-vinyltetracene, 2-ethoxy-8-vinyltetracene, 1-acetoxy-7-vinyltetracene, 1-ethyloxy-7-vinyltetracene, 2-acetoxy-8-vinyltetracene and 2-ethyloxy-8-vinyltetracene.

Of these, p-methoxystyrene and p-acetoxystyrene are preferred particularly because the membrane obtained has high blockage for liquid fuel permeation and low electric resistance.

As to the content of the aromatic polymerizable monomer in the polymerizable composition, there is no particular restriction. However, the content is preferably 10 to 99 mol %, more preferably 30 to 98 mol %, particularly preferably 50 to 95 mol % of the total amount of the polymerizable monomers contained in the polymerizable composition. By controlling the content of the aromatic polymerizable monomer in the above range, the cation exchange resin obtained shows more striking non-permeability to liquid fuel.

Polymerization

The above-prepared polymerizable composition is polymerized to obtain a resin membrane of given thickness.

The method for polymerization is the same as one described in (1) Method for production of first membrane for direct liquid fuel cell.

Conversion into Hydroxyl Group

The resin membrane obtained by the above polymerization is then subjected to hydrolysis. By the hydrolysis, the alkoxy group or acyloxy group is converted into hydroxyl group.

As the method for converting the alkoxy group into hydroxyl group, there is preferred a method of hydrolyzing the alkoxy group with a hydrogen halide (e.g. hydrobromic acid or hydrogen iodide) according to an usual manner. Specifically explaining, the resin membrane is treated with a hydrobromic acid solution of ketone or alcohol. The concentration of hydrogen halide is preferably 0.1 to 5 mol/L and the treatment temperature is preferably 20 to 90° C. The treatment time is preferably 5 to 48 hours.

As the method for converting the acyloxy group into hydroxyl group, there can be mentioned an ordinary method of ester hydrolysis. Specifically explaining, the resin membrane is treated with an aqueous solution of alkaline substance (a hydroxide of alkali metal or alkaline earth metal, such as sodium hydroxide or calcium hydroxide) or of acidic substance (e.g. hydrochloric acid or sulfuric acid), or with a mixed solution of water and alcohol or ketone. The concentration of the acidic substance or alkaline substance in hydrolysis is preferably 0.1 to 5 mol/L when, for example, sodium hydroxide is used, and the treatment temperature is preferably 20 to 80° C. The treatment time is preferably 5 to 24 hours. Such hydrolysis conditions are known in the related industry.

Introduction of Cation Exchange Group

Then, cation exchange group is introduced into the above-obtained resin membrane, which has been converted into hydroxyl group.

The cation exchange group is introduced into the aromatic ring of the resin membrane. Incidentally, this aromatic ring is derived from the aromatic ring of the aromatic polymerizable monomer compounded in the polymerizable composition.

The method for introduction of cation exchange group and the cation exchange group introduced are the same as those described in (1) Method for production of first membrane for direct liquid fuel cell.

The single type membrane for direct liquid fuel cell is a membrane of 10 to 50 μm in thickness, obtained by making the cation exchange resin represented by the chemical formula (5) into a membrane shape.

This membrane has an ion exchange capacity of 1.0 to 2.7 meq/g.

(Method for Production of Composite Type Membrane for Direct Liquid Fuel Cell)

In the method for production of the fourth membrane of composite type for direct liquid fuel cell, a certain polymerizable composition is filled in the pores of a porous membrane and then the polymerizable composition is polymerized and cured to obtain a cured resin material. Thereafter, the alkoxy group or acyloxy group of the cured resin material is converted into hydroxyl group, after which cation exchange group is introduced to obtain a composite type membrane.

In the membrane for fuel cell, composed of a cation exchange membrane obtained thus using a porous membrane as a base material, the porous membrane functions as a reinforcing part and, therefore, a high physical strength can be obtained without causing an increase in electric resistance, etc.

Polymerizable Composition

The polymerizable composition, which is a starting material in production of the present membrane, is the same as the polymerizable composition used in production of the above-mentioned single type membrane for direct liquid fuel cell. Therefore, description thereof is not made.

Porous Membrane

In the production method of the present invention, the polymerizable composition is contacted with a porous membrane. Thereby, the polymerizable composition is filled in the pores of the porous membrane.

As the porous membrane, there can be used per se the porous membrane described in the above composite type membranes for direct liquid fuel cell.

Contact of Polymerizable Composition with Porous Membrane

As the method for contact of polymerizable composition with porous membrane, there can be used per se the contact method described in the first membrane for direct liquid fuel cell.

Polymerization

By contact of the polymerizable composition with the porous membrane, the polymerizable composition filled in the pores of the porous membrane is then polymerized. The method for polymerization is the same as that described already.

Conversion to Hydroxyl Group

After the polymerizable composition has been polymerized and converted into a cured resin material, the alkoxy group or acyloxy group in the cured resin material is hydrolyzed and converted into hydroxyl group.

The method for converting into hydroxyl group is the same as that described in the above "Method for production of single type membrane for direct liquid fuel cell"; therefore, description thereof is not made.

Introduction of Cation Exchange Group

Cation exchange group is then introduced into the above-produced, hydroxyl group-introduced cured resin material filled in the pores of a porous membrane.

Cation exchange group is introduced into the aromatic ring of the cured resin material filled in the pores of a porous membrane. Incidentally, this aromatic ring is derived from the aromatic ring of the aromatic polymerizable monomer contained in the polymerizable composition.

As the cation exchange group introduced into the aromatic ring, a known cation exchange group can be employed with no particular restriction. Specifically, there can be mentioned sulfonic group, carboxyl group, phosphonic group, etc. Sulfonic group, which is a strongly acidic, is preferred particularly because the membrane obtained is low in electric resistance.

The method for introducing cation exchange group into the aromatic ring was described in detail already; therefore, description thereof is not made.

(Membrane for Direct Liquid Fuel Cell)

The thus-obtained cation exchange membranes formed by shaping a cation exchange resin into a membrane or by filling a cation exchange resin in the pores of a porous membrane, are as necessary subjected to washing, cutting, etc. and are used as a membrane for direct liquid fuel cell according to an usual method.

(5) Fifth Membrane for Direct Liquid Fuel Cell, and Production Method Therefor

The fifth membrane for direct liquid fuel cell, of the present invention (hereinafter, the membrane may be abbreviated as fifth membrane) is a membrane wherein halogen atom is bonded. The fifth membrane for direct liquid fuel cell has two types, i.e. single type and composite type, as described later.

(Single Type Membrane for Direct Liquid Fuel Cell)

The single type membrane for direct liquid fuel cell is composed of a cation exchange resin membrane schematically represented by the following chemical formula (9).

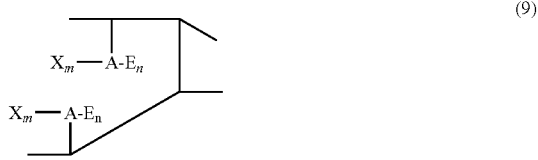

(9)

In the chemical formula (9), A is an aromatic ring and is bonded to a methylene main chain represented by a straight line. As the aromatic ring, there are a monocyclic type and a polycyclic type formed by condensation of a plurality of aromatic rings. Specifically, there can be mentioned benzene ring, naphthalene ring, anthracene ring, etc.

X is halogen atom. m is the number of the halogen atoms bonded to the aromatic ring A. m is 1 or more, preferably 1 to 4, more preferably 1 to 2.

As the halogen atom, there can be mentioned, for example, fluorine atom, chlorine atom, bromine atom and iodine atom. Of these halogen atoms, fluorine atom and chlorine atom are preferred and chlorine atom is particularly preferred.

E is a cation exchange group. As the cation exchange group, a known cation exchange group can be employed with no particular restriction. Specifically, there can be mentioned sulfonic group, carboxyl group, phosphonic group, etc. Sulfonic group, which is strongly acidic, is particularly preferred because the membrane obtained is low electric resistance. n is the number of cation exchange groups bonded to the aromatic ring, and is an integer of 1 or more. n is preferably 1 to 2.

m+n<=W Here, W is a number which is "the number of hydrogen atoms bonded to substituent-free aromatic ring−1". That is, W=6−1=5 when the aromatic ring is benzene ring; W=8−1=7 when the aromatic ring is naphthalene ring; and W=8−1=7 when the aromatic ring is anthracene ring.

The cation exchange resin represented by the above-shown chemical formula (9) has a crosslinked structure wherein methylene main chains are bonded to each other. In the chemical formula (9), a straight line of vertical direction, connecting two methylene main chains each shown by a horizontal straight line indicates a crosslinking chain schematically.

As to the crosslinking chain, there is no particular restriction, and there can be any chain as long as it can crosslink the methylene main chains to each other. The crosslinking chain is preferably selected by considering the non-permeability of liquid fuel through membrane and the reduction in electric resistance. In general, there is employed a crosslinking chain having a structure derived from a crosslinking agent widely used in polymerization. A preferred crosslinking chain is, for example, one derived from divinylbenzene.

The chemical structure of a cation exchange resin particularly preferable as the single membrane for direct liquid fuel cell is shown in the following chemical formula (10).

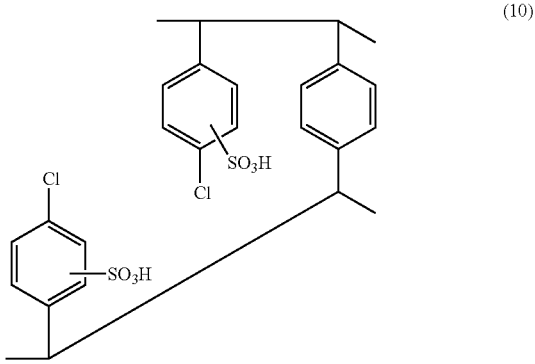

(10)

In the cation exchange resin represented by the chemical formula (10), the molar ratio of the diethylbenzene structure unit as a crosslinking chain and the chlorosulfonylbenzene unit is preferably 1:99 to 40:60, more preferably 2:98 to 30:70. The molar ratio of sulfonic group and chloro group is 1:1.

The presence of halogen atom in the cation exchange resin can be confirmed by infrared spectrometry. Specifically, the presence can be confirmed by the absorption peak of 1,090 cm$^{-1}$ which is a characteristic absorption of aromatic C—Cl, when the halogen atom is chlorine atom; and, when the halogen atom is fluorine atom, the presence can be confirmed by the absorption peak of 1,210 cm$^{-1}$ which is the characteristic absorption of aromatic C—F. The amount of halogen atom can be determined quantitatively by adding an appropriate internal standard substance into the cation exchange resin.

In the fifth membrane of single type for direct liquid fuel cell, the cation exchange resin represented by the chemical formula (10) is formed in a thickness of 10 to 100 μm.
(Composite Type Membrane for Direct Liquid Fuel Cell)

The fifth membrane of composite type for direct liquid fuel cell comprises a porous membrane used as a base material and a cation exchange resin represented by the chemical formula (9), filled in the pores of the porous membrane.

In the membrane for fuel cell, composed of a cation exchange membrane produced using a porous membrane as a base material, the porous membrane functions as a reinforcing part and, therefore, a high physical strength can be obtained without causing an increase in electric resistance, etc.
Porous Membrane As the porous membrane used as a base material, a known porous membrane can be used with no restriction as long as it is a porous membrane having pores inside and the two sides of membrane are communicated to each other by at least part of the pores. As such a porous membrane, there can be used per se the porous membrane described in (Porous membrane) of (1) Method for production of first membrane for direct liquid fuel cell. Therefore, no description is made on the porous membrane.

The amount of the cation exchange resin filled in the porous membrane is preferably 10 to 90 mass parts, more preferably 20 to 70 mass parts per 100 mass parts of the porous membrane.

The membrane of composite type for direct liquid fuel cell has a high cation exchange capacity of ordinarily 0.1 to 3 mmol/g, particularly 0.3 to 2.5 mmol/g when measured by an usual method. Therefore, it has a high cell output and also is sufficiently low in liquid fuel permeability and electric resistance. Further, since using the polymerizable composition of the above formulation, the membrane of composite type has a water content of ordinarily 5 to 90%, more preferably 10 to 80% and hardly causes an increase in electric resistance by drying, that is, a decrease in proton conductivity. Furthermore, the membrane is insoluble in liquid fuel. The membrane resistance measured by the method shown in Examples described later is extremely small at 0.40 Ω·cm$^2$ or less, further at 0.25 Ω·cm$^2$ or less. The liquid fuel permeability is extremely small and the permeability of methanol when measured by the method of Examples described later is ordinarily 1,000 g/m$^2$·hr or less and further is in a range of 10 to 700 g/m$^2$·hr.

Thus, the membrane of composite type for fuel cell is low in electric resistance and also small in liquid fuel permeability; therefore, when used as a membrane for direct liquid fuel cell, the membrane can effectively prevent the diffusion of liquid fuel fed into fuel chamber, into opposite chamber through the membrane and consequently can provide a cell of high output.

Description is made below in detail on the method for production of the fifth membrane for direct liquid fuel cell.
(Method for Production of Single Type Membrane for Direct Liquid Fuel Cell)

In the method for production of the single type membrane for direct liquid fuel cell, of the present invention, a particular polymerizable composition is prepared and polymerized/cured into a membrane shape of given thickness to obtain a resin membrane; and a cation exchange group is introduced into the resin membrane to obtain a single type membrane for direct liquid fuel cell.
Polymerizable Composition The polymerizable composition, which is a starting material used for producing a single type membrane, contains, as essential components, a) an aromatic polymerizable monomer, b) a crosslinkable polymerizable monomer and c) a polymerization initiator.

Of the essential components, the crosslinkable polymerizable monomer b) and the polymerization initiator c) are the same as those described in detail in (1) Method for production of first membrane for direct liquid fuel cell; therefore, description thereof is not made and description of the aromatic polymerizable monomer a) is made below.

a) Aromatic Polymerizable Monomer

The aromatic polymerizable monomer is a compound represented by the following chemical formula (11), wherein one polymerizable group, at least one halogen group and at least one hydrogen atom are bonded to the aromatic ring.

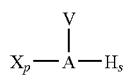 (11)

In the above chemical formula (11), V is a polymerizable group. The polymerizable group is preferably an unsaturated hydrocarbon group having 2 to 5 carbon atoms. For example, vinyl group, propenyl group, butylene group, etc. can be mentioned. Vinyl group is particularly preferred in view of the availability.

A is an aromatic ring. As the aromatic ring, there are a monocyclic type and a polycyclic type wherein a plurality of aromatic rings are condensed. Specifically, there can be mentioned, for example, benzene ring, naphthalene ring, anthracene ring and derivatives thereof.

X is halogen atom. As the halogen atom, there can be mentioned fluorine atom, chlorine atom, bromine atom, iodine atom. Of these halogen atoms, fluorine atom and chlorine atom are preferred and chlorine atom is preferred particularly.

p is an integer of 1 to 4. p is preferably 1 or 2 because the membrane obtained is high in blockage for liquid fuel permeation and is low in electric resistance, and is particularly preferably 1.

s is the number of the hydrogen atoms bonded to the aromatic ring. In the aromatic polymerizable monomer represented by the chemical formula (11), at least one hydrogen atom is bonded to the aromatic ring. This hydrogen atom is exchanged with a cation exchange group, as described later.

The sum of p and q is "the number of hydrogen atoms bondable to unsubstituted aromatic ring−1".

In the aromatic polymerizable monomer represented by the chemical formula (11), it is preferred that at least one of the halogen atoms bonded to the aromatic ring is at the para-position relative to the polymerizable group V. Owing to the bonding of halogen group at the para-position, the membrane obtained is high in blockage for liquid fuel permeation and is low in electric resistance.

As the monocyclic aromatic polymerizable monomer, there can be mentioned p-chlorostyrene, 2,4-dichlorostyrene, p-fluorostyrene, 2,4-difluorostyrene, p-bromostyrene, 2,4-dibromostyrene, p-iodostyrene, 2,4-diiodostyrene, etc.

As the bicyclic aromatic polymerizable monomer, there can be mentioned, for example, 1-chloro-5-vinylnaphthalene, 2-chloro-6-vinylnaphthalane, etc.

As the tricyclic aromatic polymerizable monomer, there can be mentioned, for example, 1-chloro-10-vinylanthracene, 8-chloro-10-vinylanthracene, 1-chloro-5-vinylanthracene, etc.

Of these, p-chlorostyrene is preferred particularly because the membrane obtained is high in blockage for liquid fuel permeation and is low in electric resistance.

As to the content of the aromatic polymerizable monomer in the polymerizable composition, there is no particular restriction. However, the content is preferably 10 to 99 mol %, more preferably 20 to 98 mol % of the total amount of the polymerizable monomers contained in the polymerizable composition. By controlling the content of the aromatic polymerizable monomer in the above range, the cation exchange resin obtained shows more striking non-permeability to liquid fuel.

Polymerization

The above-prepared polymerizable composition is polymerized keeping a membrane shape of given thickness. The polymerization method used is the same as described in (1) Method for production of first membrane for direct liquid fuel cell.

Introduction of Cation Exchange Group

Into the thus-produced resin membrane composed of a polymer of polymerizable composition is then introduced a cation exchange group.

The cation exchange group is introduced into the aromatic ring of the resin membrane. Incidentally, this aromatic ring is derived from the aromatic ring of the aromatic polymerizable monomer compounded in the polymerizable composition.

The method for introduction of cation exchange group is the same as that described in (1) Method for production of first membrane for direct liquid fuel cell.

(Method for Production of Composite Type Membrane for Direct Liquid Fuel Cell)

In the method for production of composite type membrane for direct liquid fuel cell, a particular polymerizable composition is filled in the pores of a porous membrane; the polymerizable composition is polymerized and cured to obtain a resin; and a cation exchange group is introduced into the resin to produce the present membrane.

Polymerizable Composition

The polymerizable composition, which is a starting material in production of the present membrane, is the same as the polymerizable composition used in production of the above-mentioned single type membrane for direct liquid fuel cell. Therefore, no description thereof is made.

Porous Membrane

In the production method of the present invention, the above-mentioned polymerizable composition is contacted with a porous membrane. Thereby, the polymerizable composition is filled in the pores of the porous membrane. Then, the polymerizable composition filled in the pores is polymerized and cured.

In the membrane for fuel cell, composed of a cation exchange membrane thus produced using a porous membrane as a base material, the porous membrane functions as a reinforcing part and, therefore, a high physical strength can be obtained without causing an increase in electric resistance, etc.

The porous membrane used as a base material is the same as the porous membrane described in the first membrane for direct liquid fuel cell.

Contact of Polymerizable Composition with Porous Membrane

As the method for contact of polymerizable composition with porous membrane, the contact method described in the first membrane for direct liquid fuel cell can be used as it is.

Polymerization

By the contact of the above-mentioned polymerizable composition with the above-mentioned porous membrane, the polymerizable composition is filled in the pores of the porous membrane is then polymerized. The method for polymerization is the same as that described in the first membrane of direct type.

Introduction of Cation Exchange Group

Into the above-produced membrane-shaped polymer wherein a resin (which is a polymer of a polymerizable composition) is filled in the pores of a porous membrane, is then introduced a cation exchange group.

The cation exchange group is introduced into the aromatic ring of the resin filled in the pores of the porous membrane. Incidentally, the aromatic ring is derived from the aromatic ring of the aromatic polymerizable monomer contained in the polymerizable composition.

The cation exchange group introduced into the aromatic ring and the method for introduction of the group were described above in detail. Therefore, their description is not made.

A direct liquid fuel cell employing the membrane of the present invention has generally a basic structure of the drawing, but the present membrane can be applied also to a direct liquid fuel cell having other known structure. As the liquid fuel, methanol is used most generally and, when methanol is used, the effect of the present invention is exhibited most strikingly. However, a similar excellent effect is exhibited also when ethanol, ethylene glycol, dimethyl ether, hydrazine or the like is used. Further, not only a liquid fuel but also a gas (e.g. hydrogen gas) can be used.

EXAMPLES

The present invention is described more specifically below by way of Examples. However, the present invention is not restricted to these Examples.

Incidentally, in the Examples and Comparative Examples, each membrane (cation exchange membrane) was measured for cation exchange capacity, water content, membrane resistance, methanol permeability and output voltage of fuel cell to evaluate the properties of the membrane. The measurement methods used for each property are described below.

1) Cation Exchange Capacity and Water Content

A cation exchange membrane was immersed in an aqueous 1 mol/L HCl solution for 10 hours or more to convert the membrane into a hydrogen ion type; then, the resulting cation exchange membrane was immersed in an aqueous 1 mol/L NaCl solution to replace the hydrogen ion type to a sodium ion type. The hydrogen ion liberated was determined quantitatively with an aqueous sodium hydroxide solution, using a potentiometric titration apparatus (COMTITE-900, produced by Hiranuma Sangyo K.K.) (A mol)

Then, the same cation exchange membrane was immersed in an aqueous 1 mol/L HCl solution for 4 hours or more, then taken out, and washed thoroughly with ion exchange water. Thereafter, the water on the surface of the membrane was wiped off with a tissue paper, and the mass (Wg) of the membrane when wet was measured. The membrane was vacuum-dried at 60° C. for 5 hours and measured for mass (Dg). Using these measurement values, the cation exchange capacity and water content of the cation exchange membrane were determined using the following formulas.

Cation exchange capacity $A \times 1000/D$ (mmol/g dry mass)

Water content=$100 \times (W-D)/D$ (%)

2) Membrane Thickness

A membrane of a state wetted with pure water was measured for thickness at 10 points, using a micrometer, and the average of the thicknesses measured was taken as membrane thickness.

3) Membrane Resistance

Five platinum wires each having a width of 0.3 mm were arranged apart in parallel on an insulation plate. A rectangular sample membrane of 2.0 cm in width, wetted with pure water was pushed against the platinum wires. The sample was held in a thermo-hygrostat of 40° C. and 90% RH, and an AC of 1 kHz was applied between the platinum wires to measure an AC impedance. AC impedances were measured by changing the distance between platinum wires in a range of 0.5 to 2.0 cm.

Resistance appeared between the platinum wire and the membrane owing to their contact; however, the influence was removed by calculating the specific resistance of membrane from the distance between platinum wires and the gradient of resistance. A good linear relationship was obtained between the distance between platinum wires and the resistance measured. The resistance of the membrane (sample) was calculated from the gradient of resistance and the membrane thickness, using the following formula.

$$R = 2.0 \times L^2 \times S$$

R: membrane resistance ($\Omega \cdot cm^2$)
L: membrane thickness (cm)
S: resistance gradient between wires ($\Omega \cdot cm$)

4) Methanol Permeability

An aqueous 30 mass % methanol solution was fed, by a pump for liquid chromatograph, into one chamber of a fuel cell provided with a membrane (area: 5 cm$^2$) at the middle of fuel cell. Argon gas was fed into other chamber of the fuel cell (which was at the opposite side of the membrane), at 300 ml/min. Measurement was conducted in a thermostat of 25° C. The argon gas leaving the other chamber was introduced into a gas collector; concentration of methanol in the argon gas was measured by gas chromatography to determine the amount of methanol which permeated the membrane.

5) Output Voltage of Fuel Cell

A catalyst was coated in an amount of 2 mg/cm$^2$ on a carbon paper of 100 μm in thickness and 80% in porosity, which had been subjected to a water repellency treatment with a polytetrafluoroethylene. The resulting carbon paper was vacuum-dried at 80° C. for 4 hours to obtain a gas diffusion electrode. The catalyst coated was prepared by mixing a carbon black loaded with a platinum-ruthenium alloy catalyst (ruthenium: 50 mol %) in an amount of 50 mass %, with a solution [Nafion (trade name) produced by Du Pont] obtained by dissolving 5% of perfluorocarbonsulfonic acid in alcohol and water.

Then, the gas diffusion electrode was set at the two surfaces of a fuel cell membrane to be tested. The resulting material was hot-pressed at an applied pressure of 5 MPa at 100° C. for 100 seconds and then allowed to stand at room temperature for 2 minutes. This material was assembled into a fuel cell having a structure shown in the drawing. The fuel cell was set at 25° C.; an aqueous 20 mass % methanol solution was fed into the fuel chamber and oxygen of atmospheric pressure was fed into the oxidizer chamber at 200 ml/min; and an electricity generation test was conducted. The terminal voltages of the cell at current densities of 0.1 A/cm$^2$ and 0.1 A/cm$^2$ were measured.

First Membrane

Examples 1, 2 and 3

Monomers, etc. were mixed according to the formulations shown in Table 1, to obtain monomer compositions. 400 g of each monomer composition was placed in a 500-ml glass vessel. Therein was immersed a porous membrane (made of a polyethylene having a weight-average molecular weight of 250,000, membrane thickness: 25 μm, average pore diameter: 0.03 μm, porosity: 37%).

Successively, each porous membrane was taken out from the monomer composition and was covered at the both sides with a 100-μm polyester film used as a peeling material. Thereafter, thermal polymerization was conducted under a nitrogen pressure of 0.3 MPa at 80° C. for 5 hours.

Each of the membrane-shaped materials obtained was immersed in a 1:1 mixture of 98% concentrated sulfuric acid and 90% or higher chlorosulfonic acid, at 40° C. for 60 minutes, to subject the benzene ring to sulfonation, whereby each membrane for fuel cell was obtained.

Each membrane for fuel cell was measured for cation exchange capacity, water content, membrane resistance, membrane thickness, methanol permeability and output voltage of fuel cell. The results are shown in Table 2.

Example 4

Monomers, etc. were mixed according to the formulations shown in Table 1, to obtain monomer compositions. 400 g of each monomer composition was placed in a 500-ml glass vessel. Therein was immersed a porous membrane shown in Table 1 (A or B each of 20 cm×20 cm).

Successively, each porous membrane was taken out from the monomer composition and was covered at the both sides with a 100-μm polyester film used as a peeling material. Thereafter, thermal polymerization was conducted under a nitrogen pressure of 0.3 MPa at 80° C. for 5 hours. Further, the same operation as in Example 1 was conducted to obtain membranes for fuel cell.

Each membrane for fuel cell was measured for cation exchange capacity, water content, membrane resistance, membrane thickness, methanol permeability and output voltage of fuel cell. The results are shown in Table 2.

Comparative Examples 1, 2 and 3

Membranes for fuel cell were obtained in the same operation as in Example 1 except that monomer compositions and porous membranes, all shown in Table 1 were used.

Each membrane for fuel cell was measured for cation exchange capacity, water content, membrane resistance, membrane thickness, methanol permeability and output voltage of fuel cell. The results are shown in Table 2.

Comparative Example 4

A perfluorocarbonsulfonic acid membrane (commercial product A) was measured for cation exchange capacity, water content, membrane resistance, membrane thickness, methanol permeability and output voltage of fuel cell. The results are shown in Table 2.

TABLE 1

| | Porous membrane[1] | Composition (mass parts) | | | | | | |
|---|---|---|---|---|---|---|---|---|
| | | 4-MSt[2] | 3-MSt[3] | 2-MSt[4] | St[5] | 2,4-MSt[6] | DVB[7] | PO[8] |
| Example 1 | A | 20 | | | 60 | | 20 | 5 |
| Example 2 | A | 40 | | | 40 | | 20 | 5 |
| Example 3 | A | 80 | | | | | 20 | 5 |
| Example 4 | A | | | | | 80 | 20 | 5 |
| Example 5 | B | 80 | | | | | 20 | 5 |
| Comp. Ex. 1 | A | | | | 80 | | 20 | 5 |
| Comp. Ex. 2 | A | | 80 | | | | 20 | 5 |
| Comp. Ex. 3 | A | | | 80 | | | 20 | 5 |

[1] Porous membrane
  A: made of a polyethylene of weight-average molecular weight of 250,000, membrane thickness: 25 μm, average pore diameter: 0.03 μm, porosity: 37%
  B: made of a polyethylene of weight-average molecular weight of 200,000, membrane thickness: 16 μm, average pore diameter: 0.03 μm, porosity: 41%
[2] 4-MSt: 4-methylstyrene
[3] 3-MSt: 3-methylstyrene
[4] 2-MSt: 2-methylstyrene
[5] St: styrene
[6] 2,4-MSt: 2,4-dimethylstyrene
[7] DVB: divinylbenzene
[8] PO: tert-butyl peroxyethylhexanoate

TABLE 2

| | Cation exchange capacity (mmol/g dry membrane) | Water content (%) | Membrane resistance ($\Omega \cdot cm^2$) | Membrane thickness (μm) | Methanol permeability [g/($m^2 \cdot hr$)] | Output voltage of Fuel cell (V) | |
|---|---|---|---|---|---|---|---|
| | | | | | | 0 A/$cm^2$ | 0.1 A/$cm^2$ |
| Example 1 | 2.2 | 23 | 0.05 | 29 | 700 | 0.65 | 0.30 |
| Example 2 | 2.0 | 22 | 0.05 | 28 | 500 | 0.70 | 0.33 |
| Example 3 | 2.1 | 20 | 0.05 | 28 | 300 | 0.75 | 0.38 |
| Example 4 | 1.6 | 19 | 0.06 | 27 | 240 | 0.77 | 0.40 |
| Example 5 | 2.4 | 22 | 0.03 | 19 | 500 | 0.70 | 0.36 |
| Comparative Example 1 | 2.2 | 25 | 0.05 | 29 | 1000 | 0.60 | 0.25 |
| Comparative Example 2 | 2.0 | 20 | 0.06 | 29 | 800 | 0.64 | 0.28 |
| Comparative Example 3 | 2.1 | 20 | 0.06 | 28 | 510 | 0.72 | 0.37 |

TABLE 2-continued

|  | Cation exchange capacity (mmol/g dry membrane) | Water content (%) | Membrane resistance (Ω·cm²) | Membrane thickness (μm) | Methanol permeability [g/(m²·hr)] | Output voltage of Fuel cell (V) 0 A/cm² | Output voltage of Fuel cell (V) 0.1 A/cm² |
|---|---|---|---|---|---|---|---|
| Comparative Example 4 | 0.92 | 20 | 0.17 | 200 | 1100 | 0.55 | 0.20 |

Second Membrane

Example 6

To a polymerizable monomer composition consisting of 90.5 mol % of p-(tert-butyl)styrene and 9.5 mol % of divinylbenzene was added a polymerization initiator (tert-butyl peroxyethylhexanoate) in an amount of 5 mass parts per 100 mass parts of the total monomers. In the resulting mixture was immersed a porous film (made of a polyethylene having a weight-average molecular weight of 250,000, film thickness: 25 μm, average pore diameter: 0.03 μm, porosity: 37%) for 5 minutes.

Then, the resulting porous film was taken out from the polymerizable composition and covered, at the two sides, with a 100-μm polyester film (a peeling material). Then, thermal polymerization was conducted under a nitrogen pressure of 0.3 MPa at 80° C. for 5 hours.

The membrane-shaped material obtained was immersed, at 50° C. for 60 minutes, in a 1:1 (mass ratio) mixture of 98% concentrated sulfuric acid and 90% or higher chlorosulfonic acid, to subject the benzene ring to chlorosulfonation. The resulting material was immersed in an aqueous 0.5 mol/L sodium hydroxide solution for 15 hours to hydrolyze the chlorosulfonic group for conversion into sulfonic group, to obtain a membrane for fuel cell, of the present invention.

The membrane for fuel cell was measured for cation exchange capacity, water content, electric resistance, membrane thickness, methanol permeability and output voltage of fuel cell. The results are shown in Table 4.

Examples 7 to 9

Using polymerizable compositions and porous membranes, shown in Table 3, membranes for fuel cell, of the present invention were obtained in the same manner as in Example 4. The membranes for fuel cell were measured for properties. The results are shown in Table 4.

Comparative Example 5

A membrane for fuel cell was obtained in the same manner as in Example 4 except that the p-(tert-butyl)styrene was replaced by styrene (an alkyl group-free, polymerizable monomer) and the amount of the crosslinkable monomer in the polymerizable composition was unchanged at 9.5 mol %. The membrane for fuel cell was measured for properties. The results are shown in Table 4.

TABLE 3

|  | Porous membrane[1] | Polymerizable monomers (mol %) t-BSt[3] | Polymerizable monomers (mol %) OSt[4] | Polymerizable monomers (mol %) St[5] | Polymerizable monomers (mol %) DVB[6] | Polymerization initiator (mass parts)[2] PO[7] |
|---|---|---|---|---|---|---|
| Example 4 | A | 90.5 | 0 | 0 | 9.5 | 5 |
| Example 5 | A | 0 | 90.5 | 0 | 9.5 | 5 |
| Example 6 | A | 0 | 50.0 | 35.0 | 15.0 | 5 |
| Example 7 | B | 0 | 90.5 | 0 | 9.5 | 5 |
| Comparative Example 5 | A | 0 | 0 | 90.5 | 9.5 | 5 |

[1]Porous membrane
 A: made of a polyethylene of weight-average molecular weight of 250,000, membrane thickness: 25 μm, average pore diameter: 0.03 μm, porosity: 37%
 B: made of a polyethylene of weight-average molecular weight of 200,000, membrane thickness: 20 μm, average pore diameter: 0.03 μm, porosity: 41%
[2]Amount of polymerization initiator per 100 mass parts of the total of polymerizable monomer components
[3]t-BSt: p-(tert-butyl)styrene
[4]OSt: p-(n-octyl)styrene
[5]St: styrene
[6]DVB: divinylbenzene
[7]PO: tert-butyl peroxyethylhexanoate

TABLE 4

|  | Cation exchange capacity (mmol/g dry membrane) | Water content (%) | Membrane resistance (Ω·cm²) | Membrane thickness (μm) | Methanol permeability [g/(m²·hr)] | Output voltage of Fuel cell (V) 0 A/cm² | Output voltage of Fuel cell (V) 0.1 A/cm² |
|---|---|---|---|---|---|---|---|
| Example 4 | 1.7 | 20 | 0.07 | 27 | 260 | 0.76 | 0.41 |
| Example 5 | 1.2 | 11 | 0.18 | 26 | 40 | 0.83 | 0.42 |
| Example 6 | 1.3 | 11 | 0.20 | 26 | 37 | 0.84 | 0.41 |
| Example 7 | 1.3 | 12 | 0.15 | 21 | 60 | 0.80 | 0.43 |
| Comparative Example 5 | 2.4 | 25 | 0.04 | 29 | 1000 | 0.55 | 0.30 |

Third Membrane

Examples 8 to 11

Monomers, etc. were mixed according to the formulations shown in Table 5. Thereto was added 5% (of the total mass of monomers) of tert-butyl peroxyethylhexanoate as a thermal polymerization initiator, to obtain monomer compositions. 400 g of each monomer composition was placed in a 500-ml glass vessel. Therein was immersed a porous membrane (made of a polyethylene having a weight-average molecular weight of 250,000, membrane thickness: 25 μm, average pore diameter: 0.03 μm, porosity: 37%).

TABLE 5

| | Composition (mol %) | | |
|---|---|---|---|
| | MOST[1] | St[2] | DVB[3] |
| Example 8 | 95 | 0 | 5 |
| Example 9 | 90 | 0 | 10 |
| Example 10 | 80 | 0 | 20 |
| Example 11 | 33 | 57 | 10 |
| Comparative Example 6 | 0 | 90 | 10 |
| Comparative Example 7 | 0 | 80 | 20 |

[1]MOST: p-methoxystyrene
[2]St: styrene
[3]DVB: divinylbenzene

TABLE 6

| | Cation exchange capacity (mmol/g dry membrane) | Water content (%) | Membrane resistance ($\Omega \cdot cm^2$) | Membrane thickness (μm) | Methanol permeability [$g/(m^2 \cdot hr)$] | Output voltage of Fuel cell (V) | |
|---|---|---|---|---|---|---|---|
| | | | | | | 0 A/cm$^2$ | 0.1 A/cm$^2$ |
| Example 8 | 2.3 | 25 | 0.05 | 29 | 240 | 0.75 | 0.38 |
| Example 9 | 2.1 | 19 | 0.08 | 28 | 200 | 0.76 | 0.36 |
| Example 10 | 1.8 | 14 | 0.18 | 29 | 100 | 0.78 | 0.25 |
| Example 11 | 2.2 | 21 | 0.07 | 28 | 350 | 0.73 | 0.36 |
| Comparative Example 6 | 2.3 | 25 | 0.07 | 30 | 1000 | 0.60 | 0.25 |
| Comparative Example 7 | 1.9 | 17 | 0.16 | 28 | 800 | 0.70 | 0.20 |

Successively, each porous membrane was taken out from the monomer composition and was covered at the both sides with a 100-μm polyester film (a peeling material). Thereafter, thermal polymerization was conducted under a nitrogen pressure of 0.3 MPa at 80° C. for 5 hours.

Each of the membrane-shaped material obtained was immersed in a 1:1 mixture of 98% concentrated sulfuric acid and 90% or higher chlorosulfonic acid, at 40° C. for 60 minutes, to subject the benzene ring to sulfonation, whereby each membrane for fuel cell was obtained.

After the sulfonation, infrared spectrometry was conducted, and the presence of methoxy group in each membrane was confirmed from the absorptions at 1030 cm$^{-1}$ and 1245 cm$^{-1}$ which were characteristic absorptions of ether structure.

Each membrane for fuel cell was measured for cation exchange capacity, water content, membrane resistance, membrane thickness, methanol permeability and output voltage of fuel cell. The results are shown in Table 6.

Comparative Examples 6 and 7

Membranes for fuel cell were obtained in the same operation as in Example 8 except that monomer compositions shown in Table 5 were used.

Each membrane for fuel cell was measured for cation exchange capacity, water content, membrane resistance, membrane thickness, methanol permeability and output voltage of fuel cell. The results are shown in Table 6.

Fourth Membrane

Examples 12, 13 and 14

Monomers, etc. were mixed according to the formulations shown in Table 7, to obtain monomer compositions. 400 g of each monomer composition was placed in a 500-ml glass vessel. Therein was immersed a porous membrane (made of a polyethylene having a weight-average molecular weight of 250,000, membrane thickness: 25 μm, average pore diameter: 0.03 μm, porosity: 37%).

Successively, each porous membrane was taken out from the monomer composition and was covered at the both sides with a 100-μm polyester film (a peeling material). Thereafter, thermal polymerization was conducted under a nitrogen pressure of 0.3 MPa at 80° C. for 5 hours.

The resulting membrane-shaped material was immersed in a solution obtained by mixing 100 ml of an aqueous 2 mol/L hydrobromic acid solution with 100 ml of methanol, in a 500-ml glass vessel, and a reaction was allowed to take place in a closed state at 50° C. for 24 hours to convert the methoxy group into hydroxyl group.

The membrane after the reaction was air-dried at room temperature and then was immersed in a 1:1 mixture of 98% concentrated sulfuric acid and 90% or higher chlorosulfonic acid, at 40° C. for 60 minutes, to subject the benzene ring to sulfonation, whereby each membrane for fuel cell was obtained.

Each membrane for fuel cell was measured for cation exchange capacity, water content, membrane resistance, membrane thickness, methanol permeability and output voltage of fuel cell. The results are shown in Table 8.

Examples 17, 18 and 19

Monomers, etc. were mixed according to the formulations shown in Table 7, to obtain monomer compositions. 400 g of each monomer composition was placed in a 500-ml glass vessel. Therein was immersed a porous membrane (made of a polyethylene having a weight-average molecular weight of 250,000, membrane thickness: 25 μm, average pore diameter: 0.03 μm, porosity: 37%).

Successively, each porous membrane was taken out from the monomer composition and was covered at the both sides with a 100-μm polyester film (a peeling material). Thereafter, thermal polymerization was conducted under a nitrogen pressure of 0.3 MPa at 80° C. for 5 hours.

The membrane-shaped material obtained was immersed in a solution obtained by mixing 100 ml of an aqueous 3 mol/L sodium hydroxide solution, with 100 ml of methanol, in a 500-ml glass vessel, and a reaction was conducted in a closed state at 50° C. for 24 hours, to convert the acetoxy group into hydroxyl group.

The membrane after the reaction was air-dried at room temperature and then was immersed in a 1:1 mixture of 98% concentrated sulfuric acid and 90% or higher chlorosulfonic acid, at 40° C. for 60 minutes, to subject the benzene ring to sulfonation, whereby each membrane for fuel cell was obtained.

Each membrane for fuel cell was measured for cation exchange capacity, water content, membrane resistance, membrane thickness, methanol permeability and output voltage of fuel cell. The results are shown in Table 8.

Comparative Examples 8, 9 and 10

Monomers, etc. were mixed according to the formulations shown in Table 7, to obtain monomer compositions. 400 g of each monomer composition was placed in a 500-ml glass vessel. Therein was immersed a porous membrane (made of a polyethylene having a weight-average molecular weight of 250,000, membrane thickness: 25 μm, average pore diameter: 0.03 μm, porosity: 37%).

Successively, each porous membrane was taken out from the monomer composition and was covered at the both sides with a 100-μm polyester film (a peeling material). Thereafter, thermal polymerization was conducted under a nitrogen pressure of 0.3 MPa at 80° C. for 5 hours.

The membrane-shaped material obtained was immersed in a 1:1 mixture of 98% concentrated sulfuric acid and 90% or higher chlorosulfonic acid, at 40° C. for 60 minutes, to subject the benzene ring to sulfonation, whereby each membrane for fuel cell was obtained.

Each membrane for fuel cell was measured for cation exchange capacity, water content, membrane resistance, membrane thickness, methanol permeability and output voltage of fuel cell. The results are shown in Table 8.

TABLE 7

| | Composition (mol %) | | | |
|---|---|---|---|---|
| | MOSt[1] | ACSt[2] | St[3] | DVB[4] |
| Example 14 | 90 | 0 | 0 | 10 |
| Example 15 | 33 | 0 | 57 | 10 |
| Example 16 | 80 | 0 | 0 | 20 |
| Example 17 | 0 | 90 | 0 | 10 |
| Example 18 | 0 | 33 | 57 | 10 |
| Example 19 | 0 | 80 | 0 | 20 |
| Comparative Example 8 | 0 | 0 | 95 | 5 |
| Comparative Example 9 | 0 | 0 | 90 | 10 |
| Comparative Example 10 | 0 | 0 | 80 | 20 |

[1]MOST: p-methoxystyrene
[2]ACSt: p-acetoxystyrene
[3]St: styrene
[4]DVB: divinylbenzene

TABLE 8

| | Cation exchange capacity (mmol/g dry membrane) | Water content (%) | Membrane resistance ($\Omega \cdot cm^2$) | Membrane thickness (μm) | Methanol permeability [g/($m^2 \cdot hr$)] | Output voltage of Fuel cell (V) | |
|---|---|---|---|---|---|---|---|
| | | | | | | 0 A/$cm^2$ | 0.1 A/$cm^2$ |
| Example 14 | 2.2 | 30 | 0.03 | 32 | 600 | 0.74 | 0.46 |
| Example 15 | 2.3 | 27 | 0.05 | 31 | 700 | 0.71 | 0.39 |
| Example 16 | 1.9 | 24 | 0.10 | 28 | 400 | 0.74 | 0.34 |
| Example 17 | 2.2 | 32 | 0.04 | 33 | 600 | 0.73 | 0.43 |
| Example 18 | 2.2 | 29 | 0.05 | 31 | 700 | 0.71 | 0.39 |
| Example 19 | 1.9 | 25 | 0.09 | 27 | 400 | 0.75 | 0.37 |
| Comparative Example 8 | 2.5 | 35 | 0.04 | 35 | 1600 | 0.45 | 0.15 |
| Comparative Example 9 | 2.3 | 25 | 0.07 | 30 | 1000 | 0.60 | 0.25 |
| Comparative Example 10 | 1.9 | 17 | 0.16 | 28 | 800 | 0.70 | 0.20 |

Fifth Membrane

Examples 20 to 23

Monomers, etc. were mixed according to the formulations shown in Table 9. Thereto was added 5% (of the total mass of monomers) of tert-butyl peroxyethylhexanoate as a thermal polymerization initiator, to obtain monomer compositions. 400 g of each monomer composition was placed in a 500-ml glass vessel. Therein was immersed a porous membrane (made of a polyethylene having a weight-average molecular weight of 250,000, membrane thickness: 25 μm, average pore diameter: 0.03 μm, porosity: 37%).

Successively, each porous membrane was taken out from the monomer composition and was covered at the both sides with a 100-μm polyester film (a peeling material). Thereafter, thermal polymerization was conducted under a nitrogen pressure of 0.3 MPa at 80° C. for 5 hours.

TABLE 9

| | Composition (mol %) | | | |
|---|---|---|---|---|
| | 4ClSt[1] | 4FSt[2] | St[3] | DVB[4] |
| Example 18 | 90 | 0 | 0 | 10 |
| Example 19 | 50 | 0 | 40 | 10 |
| Example 20 | 80 | 0 | 0 | 20 |
| Example 21 | 0 | 90 | 0 | 10 |
| Comparative Example 11 | 0 | 0 | 90 | 10 |
| Comparative Example 12 | 0 | 0 | 80 | 20 |

[1] MOSt: 4-chlorostyrene
[2] ACSt: 4-fluorostyrene
[3] St: styrene
[4] DVB: divinylbenzene

TABLE 10

| | Cation exchange capacity (mmol/g dry membrane) | Water content (%) | Membrane resistance ($\Omega \cdot cm^2$) | Membrane thickness (μm) | Methanol permeability [g/($m^2 \cdot hr$)] | Output voltage of Fuel cell (V) | |
|---|---|---|---|---|---|---|---|
| | | | | | | 0 A/cm$^2$ | 0.1 A/cm$^2$ |
| Example 20 | 2.1 | 0.24 | 0.07 | 30 | 300 | 0.74 | 0.37 |
| Example 21 | 2.2 | 0.26 | 0.06 | 31 | 600 | 0.69 | 0.31 |
| Example 22 | 1.7 | 0.18 | 0.16 | 28 | 200 | 0.77 | 0.27 |
| Example 23 | 2.1 | 0.25 | 0.07 | 30 | 350 | 0.73 | 0.34 |
| Comparative Example 11 | 2.3 | 25 | 0.07 | 30 | 1000 | 0.60 | 0.25 |
| Comparative Example 12 | 1.9 | 17 | 0.16 | 28 | 800 | 0.70 | 0.20 |

Each of the membrane-shaped material obtained was immersed in a 1:1 mixture of 98% concentrated sulfuric acid and 90% or higher chlorosulfonic acid, at 40° C. for 60 minutes, to subject the benzene ring to sulfonation, whereby each membrane for fuel cell was obtained.

After the sulfonation, infrared spectrometry was conducted, and the presence of chloro group in each membrane was confirmed from the absorption at 1090 cm$^{-1}$ which was the characteristic absorption of aromatic C—Cl structure. In a similar manner, the presence of fluoro group was confirmed from the absorption at 1210 cm$^{-1}$.

Each membrane for fuel cell was measured for cation exchange capacity, water content, membrane resistance, membrane thickness, methanol permeability and output voltage of fuel cell. The results are shown in Table 10.

Comparative 11 and 12

Membranes for fuel cell were obtained in the same operation as in Example 20 except that monomer compositions shown in Table 9 were used.

Each membrane for fuel cell was measured for cation exchange capacity, water content, membrane resistance, membrane thickness, methanol permeability and output voltage of fuel cell. The results are shown in Table 10.

The invention claimed is:

1. A method for producing a membrane for direct liquid fuel cell, which comprises polymerizing and curing a polymerizable composition containing at least
   a) an aromatic polymerizable monomer wherein one polymerizable group, at least one hydrogen atom, and at least one substituent selected from the group consisting of methyl group and alkyl group having two or more carbon atoms are bonded to the aromatic ring and, when the number of methyl groups bonded to the aromatic ring is one or more, at least one of the methyl groups is bonded to the aromatic ring at the para-position relative to the polymerizable group,
   b) divinylbenzene, and
   c) a polymerization initiator,
and then introducing a cation exchange group into the aromatic ring derived from the aromatic polymerizable monomer.

2. A method for producing a membrane for direct liquid fuel cell, which comprises contacting a polymerizable composition containing at least
   a) a monocyclic aromatic polymerizable monomer wherein one polymerizable group, at least one hydrogen atom, and at least one substituent selected from the group consisting of methyl group and alkyl group having two or more carbon atoms are bonded to the aromatic ring and, when the number of methyl groups bonded to the aromatic ring is one or more, at least one of the methyl groups is bonded to the aromatic ring at the para-position relative to the polymerizable group, b) divinylbenzene, and c) a polymerization initiator, with a porous membrane to fill the polymerizable composition in the pores of the porous membrane, then polymerizing and curing the polymerizable composition, thereafter introducing a cation exchange group into the aromatic ring derived from the aromatic polymerizable monomer.

3. A method for producing a membrane for direct liquid fuel cell, which comprises polymerizing and curing a polymerizable composition containing at least a) an aromatic polymerizable monomer wherein one polymerizable group, at least one alkoxy group or acyloxy group, and at least one hydrogen atom are bonded to the aromatic ring, b) a crosslinkable polymerizable monomer, and c) a polymerization initiator, to obtain a resin membrane, then hydrolyzing the alkoxy group or acyloxy group in the resin membrane to convert the alkoxy group or acyloxy group to hydroxyl group, thereafter introducing a cation exchange group into the aromatic ring in the resin membrane, derived from the aromatic polymerizable monomer.

4. A method for producing a membrane for direct liquid fuel cell, which comprises contacting a polymerizable composition containing at least a) an aromatic polymerizable monomer wherein one polymerizable group, at least one alkoxy group or acyloxy group, and at least one hydrogen atom are bonded to the aromatic ring, b) a crosslinkable polymerizable monomer, and c) a polymerization initiator, with a porous membrane to fill the polymerizable composition in the pores of the porous membrane, then polymerizing and curing the polymerizable composition to form a cured resin material, then hydrolyzing the alkoxy group or acyloxy group in the cured resin material to convert the alkoxy group or acyloxy group to hydroxyl group, thereafter introducing a cation exchange group into the aromatic ring in the cured resin material, derived from the aromatic polymerizable monomer.

5. The method for producing a membrane for direct liquid fuel cell, according to claim 1, wherein the aromatic polymerizable monomer is a monocyclic aromatic polymerizable monomer.

6. The method for producing a membrane for direct liquid fuel cell, according to claim 5, wherein the monocyclic aromatic polymerizable monomer has a styrene structure.

7. A membrane for direct liquid fuel cell, which comprises an ion exchange resin wherein an aromatic ring having at least one cation exchange group and at least one hydroxyl group is bonded to methylene main chain having a crosslinked structure.

8. A membrane for direct liquid fuel cell, which comprises a porous membrane and an ion exchange resin filled in the pores of the porous membrane, the ion exchange resin being an ion exchange resin wherein an aromatic ring having at least one cation exchange group and at least one hydroxyl group is bonded to methylene main chain having a crosslinked structure.

9. The membrane for direct liquid fuel cell, according to claim 7, wherein the crosslinked structure is formed by connecting methylene main chains with a diethylbenzene structure.

* * * * *